US011013999B2

(12) United States Patent
Kusakihara

(10) Patent No.: US 11,013,999 B2
(45) Date of Patent: May 25, 2021

(54) COMPUTER-READABLE NON-TRANSITORY STORAGE MEDIUM HAVING STORED GAME PROGRAM, INFORMATION PROCESSING SYSTEM, INFORMATION PROCESSING APPARATUS, AND INFORMATION PROCESSING METHOD FOR GENERATING A GAME IMAGE HAVING AT LEAST AN IMAGE OF A VIRTUAL SPACE AND A MAP IMAGE

(71) Applicant: NINTENDO CO., LTD., Kyoto (JP)

(72) Inventor: Toshiyuki Kusakihara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 79 days.

(21) Appl. No.: 16/416,861

(22) Filed: May 20, 2019

(65) Prior Publication Data
US 2019/0366212 A1  Dec. 5, 2019

(30) Foreign Application Priority Data

Jun. 4, 2018 (JP) .............................. JP2018-106967
Dec. 21, 2018 (JP) .............................. JP2018-239379

(51) Int. Cl.
*A63F 13/426* (2014.01)
*A63F 13/5255* (2014.01)
(Continued)

(52) U.S. Cl.
CPC ........ *A63F 13/5255* (2014.09); *A63F 13/426* (2014.09); *A63F 13/5372* (2014.09); *G06F 3/04815* (2013.01); *A63F 2300/65* (2013.01)

(58) Field of Classification Search
CPC ................ A63F 13/5255; A63F 13/426; A63F 13/5372; A63F 2300/65; G06F 3/04815
See application file for complete search history.

(56) References Cited

U.S. PATENT DOCUMENTS

2004/0157662 A1\* 8/2004 Tsuchiya ............. A63F 13/5378
463/32
2006/0178179 A1\* 8/2006 Neveu ..................... A63F 13/22
463/5

(Continued)

FOREIGN PATENT DOCUMENTS

JP  2018-011894 A  1/2018

OTHER PUBLICATIONS https://fireemblemechoes.nintendo.com/gameplay/ printed May 16, 2019.

(Continued)

*Primary Examiner* — David L Lewis
*Assistant Examiner* — Shauna-Kay Hall
(74) *Attorney, Agent, or Firm* — Scully, Scott, Murphy & Presser, P.C.

(57) ABSTRACT

In an example of an information processing system, a field in a virtual space is divided into a plurality of sections, and a player character moves in units of the sections on the field. On a game screen, an image of the virtual space based on a virtual camera and a map image representing a range of at least a part of the field are displayed. When a direction of the virtual camera changes, an image representing the field rotates such that an up direction of the map image corresponds to a direction along the field in a direction of the virtual camera. In the map image, the image representing the field, an image representing the player character, images representing the sections, and an image indicating a movable range of the player character are displayed.

38 Claims, 14 Drawing Sheets

(51) Int. Cl.
*A63F 13/5372* (2014.01)
*G06F 3/0481* (2013.01)

(56) References Cited

U.S. PATENT DOCUMENTS

| | | | | |
|---|---|---|---|---|
| 2007/0200855 | A1* | 8/2007 | Minagawa | A63F 13/577 |
| | | | | 345/474 |
| 2008/0254882 | A1* | 10/2008 | Watanabe | A63F 13/525 |
| | | | | 463/31 |
| 2009/0104990 | A1* | 4/2009 | Tsujino | A63F 13/5255 |
| | | | | 463/32 |
| 2010/0273544 | A1* | 10/2010 | Koganezawa | A63F 13/837 |
| | | | | 463/2 |
| 2011/0245942 | A1* | 10/2011 | Yamamoto | A63F 13/5258 |
| | | | | 700/91 |
| 2011/0304620 | A1* | 12/2011 | Yamada | A63F 13/5378 |
| | | | | 345/420 |

OTHER PUBLICATIONS

Notice of Reasons for Refusal dated Sep. 7, 2020 received in Japanese Patent Application No. JP 2018-239379 together with an English language translation.

Ninokuni, "Wrath of the White Witch", Starting Guide, Nov. 29, 2011, first edition, pp. 6, 11.

Oku, Y., "Sengoku Cyber Fujimaru", Hell Edition, Sep. 18, 1998, pp. 14-15.

"Game live 25 act", YouTube.com, Jun. 8, 2015, https://www.youtube.com/watch?v=JqeOM3C-aIU.

* cited by examiner

F I G. 1
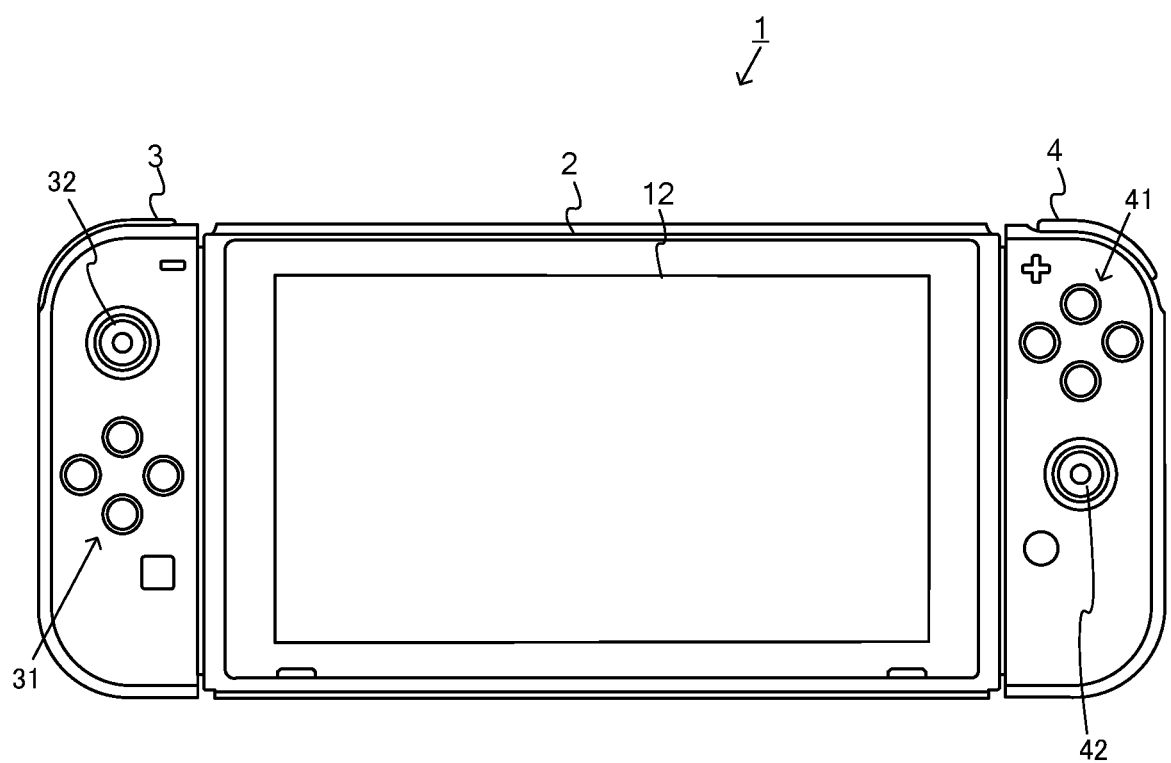

COMPUTER-READABLE NON-TRANSITORY STORAGE MEDIUM HAVING STORED GAME PROGRAM, INFORMATION PROCESSING SYSTEM, INFORMATION PROCESSING APPARATUS, AND INFORMATION PROCESSING METHOD FOR GENERATING A GAME IMAGE HAVING AT LEAST AN IMAGE OF A VIRTUAL SPACE AND A MAP IMAGE

CROSS REFERENCE TO RELATED APPLICATION

The disclosures of Japanese Patent Application No. 2018-239379, filed on Dec. 21, 2018, and Japanese Patent Application No. 2018-106967, filed on Jun. 4, 2018, are incorporated herein by reference.

FIELD

The present exemplary embodiment relates to a computer-readable non-transitory storage medium having stored therein a game program, an information processing system, an information processing apparatus, and an information processing method.

BACKGROUND AND SUMMARY

For example, there is a game that progresses by a character moving in section units set on a field in a virtual space.

In the above game, however, the virtual space cannot be viewed from various viewpoints. Thus, there is room for improvement in increasing the degree of freedom in a viewpoint while maintaining the operability in a game.

Therefore, it is an object of an exemplary embodiment to provide a game program and the like capable of increasing the degree of freedom in a viewpoint while maintaining the operability in a game.

To achieve the above object, the exemplary embodiment employs the following configurations.

A game according to the exemplary embodiment program is executed by at least one processor of an information processing apparatus. The at least one processor, based on an operation input, controls an operation target object on a field in a three-dimensional virtual space. The at least one processor, based on an operation input, controls at least a direction of a virtual camera in the virtual space. The at least one processor generates a map image representing a range of at least a part of the field. The at least one processor generates a game image at least including an image of the virtual space based on the virtual camera and the map image. The at least one processor, based on the operation input, moves the operation target object in units of predetermined sections set in the field. The at least one processor, in accordance with a change in the direction of the virtual camera, rotates an image representing the field, such that an up direction of the map image when the map image is displayed corresponds to a direction along the field in the direction of the virtual camera. Further, the at least one processor generates the map image including the image representing the field, an image representing the operation target object, images indicating the sections, and an image indicating a movable range of the operation target object regarding a movement in the units of the sections.

Based on the above, in a game where an operation target object moves in section units on a field in a virtual space, a user can advance the game while viewing at least a map image, and can also view the virtual space from various angles by changing the direction of a virtual camera in the virtual space. Further, a game image including an image of the virtual space based on the virtual camera and the map image is generated. Thus, it is possible to smoothly advance the game without needing to switch to either image.

The game program may further cause the at least one processor to, based on an operation input, indicate a section as a movement destination of the operation target object within the movable range. The at least one processor, when an operation input for finalizing the indicated section as the movement destination is provided, may move the operation target object to the indicated section as the movement destination. The at least one processor, when the section as the movement destination is indicated, may generate the map image further including a path image indicating a path from a section where the operation target object is placed before the movement to the indicated section.

Based on the above, in the map image, the path from a position before a movement to a movement destination is displayed. Thus, it is possible to make it easy for the user to recognize the relationship between positions before and after the movement of the operation target object based on the map image.

The at least one processor, in accordance with a movement of the virtual camera, may move the range of the field included in the map image, and may generate the map image so as to include the image representing the field in a field of view of the virtual camera.

Based on the above, even when the virtual camera moves, it is possible to display in the map image the range of the field included in the field of view of the virtual camera.

The game program may further cause the at least one processor to, based on a direction input included in the operation input, move an indicated position in the virtual space in a direction on the field corresponding to the input direction relative to the image of the virtual space based on the virtual camera or the map image. The at least one processor may move the virtual camera in accordance with the indicated position. The at least one processor may generate the map image such that a section indicated by the indicated position is placed in a center of the map image.

Based on the above, the image of the virtual space and the map image operate in conjunction with each other. Thus, no matter which of the images the user views, the user can move an indicated position. Further, the virtual camera also moves in accordance with the indicated position, and the indicated section is placed in the center of the map image. Thus, it is possible to make it easy to grasp the situation of the field centered on the indicated position.

The game program may further cause the at least one processor to, in a case where a determination instruction is given based on the operation input when a character object is placed in the indicated section, select as the operation target object the character object placed in the indicated section. The at least one processor may move the selected character object in the units of the predetermined sections set in the field. The at least one processor may generate the map image including the image representing the field, an image representing the selected character object, the images indicating the sections, and the image indicating the movable range of the character object regarding a movement in the units of the sections.

Based on the above, the indicated position is moved, and a determination instruction is given, whereby it is possible to move a character object as the operation target object. Thus, it is possible to include in the map image an image indicating the character object and an image representing a movement range of the character object.

The at least one processor may perform zoom control of the virtual camera based on the operation input. The at least one processor, in accordance with the zoom control, may change a form of the operation target object, and when a zoom rate is higher than a predetermined zoom rate, may change the form of the operation target object to a form in which a plurality of objects are included.

Based on the above, the form of the operation target object is changed to a form (a group display form) in which a plurality of objects are included, whereby it is possible to improve appearance. Further, when the operation target object is displayed in the group display form in the image of the virtual space, there is a possibility that it is difficult to distinguish the operation target object from another group adjacent to the operation target object. However, since the map image is displayed even in such a case, the user can advance the game.

The at least one processor may perform zoom control of the virtual camera based on the operation input. The at least one processor, in accordance with the zoom control, may switch a display state and a hidden state of the map image, and when a zoom rate is lower than a predetermined zoom rate, may hide the map image.

Based on the above, when a zoom rate is low, the map image is hidden. Thus, for example, using the entirety of the screen, it is possible to show the user a relatively wide range based on the image of the virtual space based on the virtual camera. Conversely, when the zoom rate is high, the map image is displayed. Thus, even when a relatively small range is displayed based on the image of the virtual space, it is possible to show the user a wide range in the map image.

The at least one processor, when the map image is hidden, may display the image indicating the movable range in the image of the virtual space.

Based on the above, even when the map image is hidden, it is possible to display an image indicating a movable range of the operation target object.

The game program may further cause the at least one processor to calculate the movable range based on a movable amount indicating the number of sections where the operation target object can move at one time set for the operation target object, and a movement consumption amount set with respect to each section of the field.

Based on the above, it is possible to set a movement consumption amount with respect to each section and calculate a movable range based on the movement consumption amount. For example, a section of which the movement consumption amount is large and a section of which the movement consumption amount is small are set, whereby the movable range varies, and the level of strategy of the game increases. Thus, it is possible to improve interest.

The at least one processor may cause the operation target object to perform an attack action of attacking an enemy object in the virtual space specified based on the operation input after a movement. The at least one processor may generate the map image including the image indicating the movable range and an image indicating an attack-possible range of the operation target object.

Based on the above, in addition to a movable range, it is possible to display an attack-possible range in the map image.

The at least one processor may calculate an attack-possible range of an enemy object in the virtual space and may generate the map image further including an image indicating the attack-possible range of the enemy object.

Based on the above, it is possible to display an attack-possible range of an enemy object in the map image.

The image representing the operation target object may include an image indicating the operation target object that is an icon image indicating a type of the operation target object, and a parameter image indicating a physical strength parameter of the operation target object. The at least one processor may generate the map image further including an image indicating the enemy object that is an icon image indicating a type of the enemy object, and a parameter image indicating a physical strength parameter of the enemy object.

Based on the above, by viewing the map image, the user can know the type and the physical strength parameter of the operation target object and the type and the physical strength parameter of an enemy object and advance the game based on these pieces of information.

The game program may further cause the at least one processor to, based on the operation input, indicate a section as a movement destination of the operation target object within the movable range. The at least one processor may move the operation target object to the indicated section as the movement destination. Further, the game program may further cause the at least one processor to place in the virtual space a range object indicating the movable range, and a path object indicating a path from a section where the operation target object is placed before the movement to the indicated section of the movement destination.

Based on the above, a range object and a path object are placed in the virtual space. Thus, when these objects are present in the field of view of the virtual camera, then by viewing the image of the virtual space based on the virtual camera, the user can know the movable range of the operation target object. Further, a path to a movement destination is also displayed. Thus, it is possible to easily recognize the relationship between positions before and after the movement.

The at least one processor may further place in the virtual space an information object indicating information regarding the operation target object.

Based on the above, when an information object is present in the field of view of the virtual camera, it is possible to display information regarding the operation target object in the image of the virtual space based on the virtual camera.

The game program may further cause the at least one processor to, based on an operation input, select the operation target object. The at least one processor may, before a predetermined finalization operation is performed, based on an operation input, move the selected operation target object to any position within the movable range in the virtual space, and when the finalization operation is performed, finalize a movement of the operation target object to a section where the operation target object moved by the movement before the finalization operation is performed is located. The at least one processor, while the operation target object is moved by the movement before the finalization operation is performed, may generate the map image further including a path image indicating a path from a section corresponding to a position of the operation target object before the operation target object is moved by the movement to a section corresponding to a position of the operation target object while the operation target object is moved by the movement.

Based on the above, while the operation target object is moved (until a finalization operation is performed), it is possible to freely move the operation target object in the virtual space. Even when the operation target object freely moves in the virtual space, in the map image, a path image indicating the position of the operation target object before and after the movement is displayed. Thus, the user can recognize from which section to which section the operation target object is to move.

The at least one processor, when a cancellation operation for canceling the movement is performed before the finalization operation is performed, may return the operation target object to the position before the operation target object is moved by the movement.

Based on the above, by a cancellation operation, it is possible to return the operation target object moved before the finalization operation is performed, to the position before the movement.

The operation target object may include a first character and a second character. The at least one processor, based on the operation input, may move the first character to any position within the movable range in the virtual space, and in accordance with the movement of the first character, may move the second character following the first character.

Based on the above, it is possible to cause a second character to follow a first character. The user can efficiently move the operation target object including the first character and the second character.

The operation target object may include a first character and a second character. The game program may further cause the at least one processor to, when the operation target object is selected, display the first character to be larger than the second character.

Based on the above, a first character is displayed to be larger than a second character. Thus, it is possible to allow the user to recognize that the operation target object is selected.

Further, another exemplary embodiment may be an information processing system, an information processing apparatus, or an information processing method for executing the above game program.

According to the exemplary embodiment, in a game where an operation target object moves in section units on a field in a virtual space, it is possible to advance the game at least based on a map image while changing the direction of a virtual camera.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 1 is a diagram showing an example of an example non-limiting game system 1 according to an exemplary embodiment;

DETAILED DESCRIPTION OF NON-LIMITING EXAMPLE EMBODIMENTS

Figure 2:
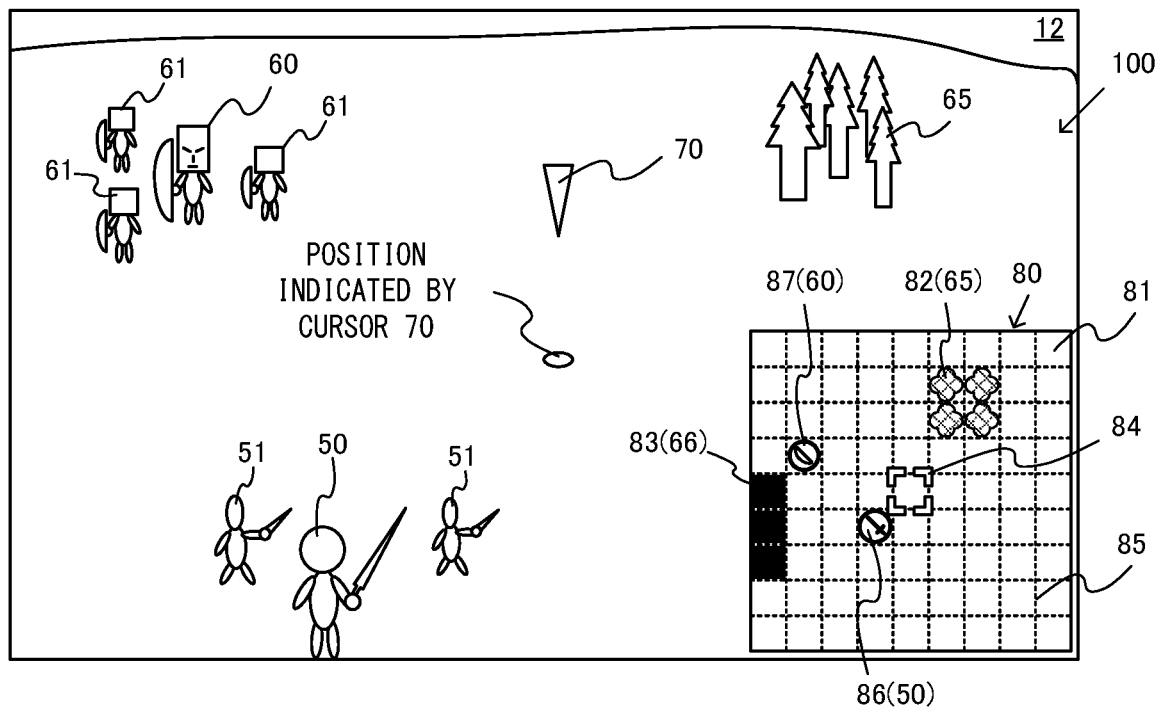
FIG. 2 is a diagram showing an example of an example non-limiting game image displayed on a display screen 12 when a game according to the exemplary embodiment is performed.

With reference to the drawings, a game system 1 (an example of an information processing system) according to an exemplary embodiment is described below. FIG. 1 is a diagram showing an example of the game system 1 according to the exemplary embodiment. As shown in FIG. 1, the game system 1 includes a main body apparatus 2, a left controller 3, a right controller 4, and a display device including a display screen 12. It should be noted that the left controller 3 and the right controller 4 may be attachable to and detachable from the main body apparatus 2.

The left controller 3 is a controller operated with the left hand of a user. The left controller 3 includes a plurality of operation buttons 31 and an analog stick 32 as a direction input section. Further, the right controller 4 is a controller operated with the right hand of the user. The right controller 4 includes a plurality of operation buttons 41 and an analog stick 42 as a direction input section.

Based on an operation performed using the left controller 3 or the right controller 4, the main body apparatus 2 performs game processing described later and displays an image corresponding to the result of the game processing on the display screen 12. Although not shown in the figures, the main body apparatus 2 includes a CPU for executing a game program described later, a GPU, a memory, a storage device (e.g., a non-volatile memory), and a slot into which an external storage medium is inserted. The game program is stored in the storage device built into the main body apparatus 2 or the external storage medium.

It should be noted that FIG. 1 is a mere example of hardware for executing a game according to the exemplary embodiment described below. The game according to the exemplary embodiment may be executed by any other information processing apparatus. For example, the information processing apparatus may execute game processing, and a game image corresponding to the result of the game processing may be displayed on an external display device (e.g., a television receiver). Further, for example, the game according to the exemplary embodiment may be executed by a stationary or mobile game apparatus, a personal computer, a smartphone, a tablet terminal, or the like. Further, the game according to the exemplary embodiment may be executed by a system where a terminal and a server are connected together via a network (e.g., the Internet).

(Description of Game)

The game according to the exemplary embodiment is described below. When the game according to the exemplary embodiment is executed, a three-dimensional virtual space represented by an XYZ orthogonal coordinate system is defined within the main body apparatus 2. In the virtual space, a field (a ground or the like) is set, and a player character operated by the user, an enemy character controlled by the game system 1, and various other objects are placed on the field. Further, in the virtual space, a virtual camera VC (see FIG. 9) is set.

FIG. 2 is a diagram showing an example of a game image displayed on the display screen 12 when the game according to the exemplary embodiment is performed.

As shown in FIG. 2, in the center (an area other than a map image 80 at the lower right) of the display screen 12, a virtual space image 100 based on a virtual camera VC is displayed. The virtual space image 100 is an image obtained by viewing the three-dimensional virtual space from the virtual camera VC and is also a three-dimensional realistic image. In the virtual space image 100, a player character 50 operated by the user and an enemy character 60 controlled by the game system 1 are displayed.

The game according to the exemplary embodiment is a game where an own army including the player character 50 and an enemy army including the enemy character 60 fight against each other by moving on the field in the virtual space. The field in the virtual space is divided into a plurality of sections (a grid). A single section is, for example, a virtually set square with 10-meter sides. The player character 50 and the enemy character 60 move in these section (grid) units on the field.

Around the player character 50, a plurality of soldier characters 51 are placed. The player character 50 and the plurality of soldier characters 51 form a single small group and are placed in a single section. The player character 50 is the leader of the small group, and the plurality of soldier characters 51 are characters accompanying the leader. The player character 50 and the plurality of soldier characters 51 as the small group move on the field or attack the enemy character. Thus, hereinafter, the small group including the player character 50 will occasionally be referred to as the "player character 50". Further, when only the player character 50, which is the leader, in the small group including the characters 50 and 51 is particularly represented, the player character 50 will occasionally be referred to as "the player character 50 (the leader)". Similarly, around the enemy character 60, a plurality of soldier characters 61 are placed. The enemy character 60 and the plurality of soldier characters 61 form a single small group and are placed in a single section. The enemy character 60 and the plurality of soldier characters 61 as the small group move on the field or attack the player character. Thus, hereinafter, the small group including the enemy character 60 will be referred to as "the enemy character 60".

In the virtual space, as the own army, in addition to the player character 50 (the small group), a plurality of player characters (small groups) are also placed. Similarly, in the virtual space, as the enemy army, in addition to the enemy character 50 (the small group), a plurality of enemy characters (small groups) are also placed. The user causes the plurality of player characters (the small groups) including the player character 50 to move or attack the enemy character on the field in the virtual space, thereby aiming to gain ascendancy over the enemy army. In the exemplary embodiment, a turn in which the user side performs an operation and a turn in which the enemy side performs an operation are alternately repeated, whereby the game progresses. In a single turn of the user side, the user causes one or more player characters to move, or causes a player character to make an attack.

Further, in the game according to the exemplary embodiment, a plurality of fields are prepared, and in any of the plurality of fields, the own army and the enemy army fight against each other. For example, the types of the plurality of fields include a grassland field where objects such as a tree and a rock are placed, and a volcanic zone field where lava flows in places. The field may be composed of a planar surface, a curved surface, an uneven surface, or the like. The field is, for example, placed on the XZ plane set in the virtual space. Thus, a position on the field in the virtual space can be represented by X-axis and Z-axis coordinate values in the XYZ coordinate system.

FIG. 2 shows the grassland field. As shown in FIG. 2, various objects are placed on the field in the virtual space. For example, a forest object 65 and a rock object 66 (see FIG. 7) are placed. The forest object 65 is an object in which it is more difficult for the player character 50 or the enemy character 60 to move than usual. That is, when the movement path of the player character 50 is selected, and if a path through the forest object 65 is selected, the distance at which the player character 50 can move is shorter than usual. Further, in the virtual space, an object (e.g., the rock object 66 in FIG. 7) through which the player character 50 or the enemy character 60 cannot pass is placed.

Further, as shown in FIG. 2, on the display screen 12, in addition to the player character 50 and the enemy character 60, a cursor 70 is displayed. The cursor 70 is an indication object for the user to indicate a position or an object in the virtual space. The cursor 70 is, for example, placed at a position a predetermined distance away in an up direction (a Y-axis direction) of the virtual space from an indicated position on the field indicated by the cursor 70.

Figure 3:
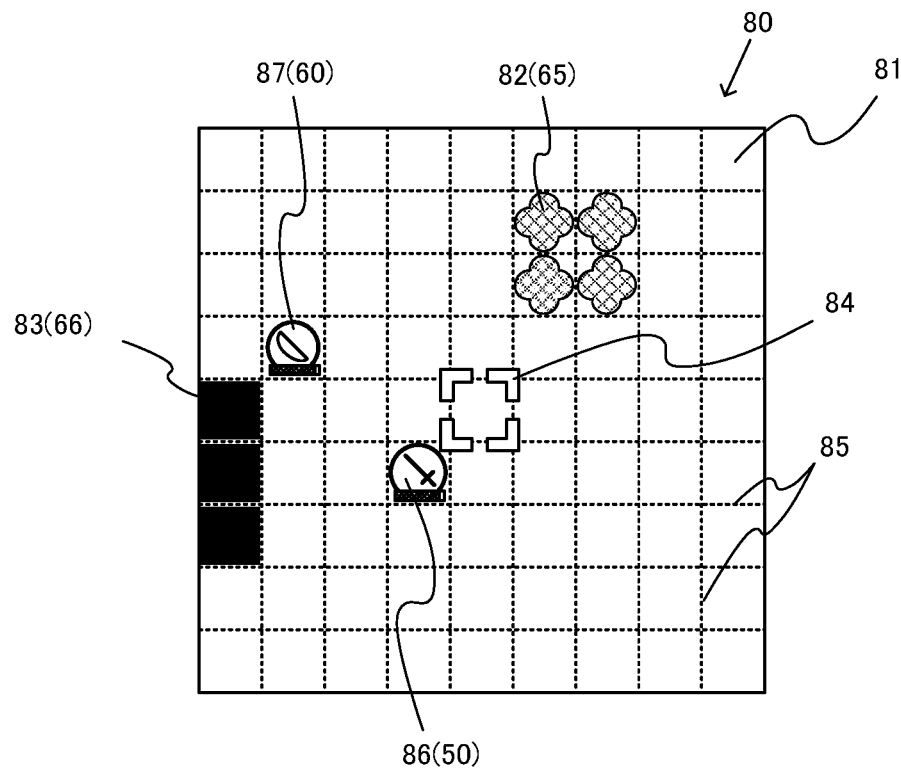
FIG. 3 is an enlarged view of an example non-limiting map image 80 in FIG. 2.

Further, in a lower right area of the display screen 12, a rectangular map image 80 is displayed. The map image 80 is an image indicating the range of at least a part of the field in the virtual space and is also an image representing a map of the field in the virtual space. The map image 80 is an image representing a wide range of the field also including a peripheral range not included in a field of view of the virtual camera VC. Although there are various methods for drawing the map image 80, for example, the map image 80 as a planar object is placed in the virtual space, whereby it is possible to draw the map image 80 together with the virtual space image 100 by three-dimensional image processing. Further, it is also possible to overwrite the map image 80 as a two-dimensional image in a superimposed manner on the virtual space image 100. Although either technique may be employed, in the following description, for convenience, an area other than the map image 80 will be referred to as "the virtual space image 100". Further, unless otherwise stated, in the description of the virtual space, it does not matter whether or not the map image 80 is placed. With reference to FIG. 3, the details of the map image 80 will be described.

FIG. 3 is an enlarged view of the map image 80 in FIG. 2. As shown in FIG. 3, the map image 80 includes an image 81 representing at least a part of the field in the virtual space. In the exemplary embodiment, a field image representing the field of the virtual space is stored in advance corresponding to each of the plurality of fields. For example, a field image representing the entirety of the grassland field and a field image representing the entirety of the volcanic zone field are stored. A field image is, for example, a planar image looking down on the entirety of the field from directly above the virtual space and is also an image obtained by simplifying the field in the virtual space. The field image includes images representing objects placed in the field in the virtual space. A position on the field image and a position on the field in the virtual space correspond to each other, and the position on the field image can be represented by X-axis and Z-axis coordinate values. For convenience, a coordinate system on the field in the virtual space and a coordinate system on the field image can be the same. An image representing an object placed at a predetermined position (X, Z) on the field in the virtual space is also drawn at a predetermined position (X, Z) on the field image.

The image 81 in FIG. 3 is an image obtained by clipping a part of the field image representing the entirety of the grassland field. Specifically, the image 81 is an image having a color (e.g., green) representing a grassland on the whole and is also an image including a forest icon 82 representing the forest object 65 and a rock icon 83 representing the rock object 66 (see FIG. 7).

Further, the map image 80 includes a plurality of section images 85 (a plurality of vertical and horizontal dashed lines in the map image 80) indicating the boundaries between sections set in the field, and the map image 80 is divided into a plurality of sections by the section images 85. The section images 85 are drawn in a field image stored in advance, and the map image 80 is generated by extracting a part of the field image including the section images 85 in a shape suitable for display. It should be noted that the section images 85 may not be drawn in data of the field image, and the section images 85 may be superimposed on the field image later, thereby generating the map image 80.

Further, the map image 80 includes a player character icon 86 representing the player character 50, and an enemy character icon 87 representing the enemy character 60. The player character icon 86 is placed in a section corresponding to the position of the player character 50 on the field in the virtual space. Further, the enemy character icon 87 is placed in a section corresponding to the position of the enemy character 60 on the field in the virtual space. The player character icon 86 and the enemy character icon 87 are represented in different colors. For example, the player character icon 86 is displayed in blue indicating the color of the army on the user side, and the enemy character icon 87 is displayed in red indicating the color of the army on the enemy side.

Further, in the game according to the exemplary embodiment, a plurality of types of characters (small groups) are prepared as player characters and enemy characters and have different properties depending on the type of the character (the small group). For example, there are a character of which the movement range is relatively small and the offensive strength is great, a character of which the movement range is small but the attack range is wide, a character of which the offensive strength is great, a character of which the defensive strength is great, and the like. An icon corresponding to the type of the character is prepared, and in the map image 80, an icon corresponding to the type of the character is displayed. For example, as shown in FIG. 3, the player character 50 is a character handling a sword, and therefore, a sword is drawn within the player character icon 86. Further, the enemy character 60 is a character handling a bow, and therefore, a bow is drawn within the enemy character icon 87.

Figure 4:
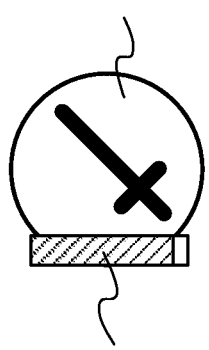
FIG. 4 is an enlarged view of an example non-limiting player character icon 86.

FIG. 4 is an enlarged view of the player character icon 86. As shown in FIG. 4, to the player character icon 86, a physical strength display image 86a is added. The physical strength display image 86a indicates the value of the current physical strength parameter of the player character 50. When the player character 50 is attacked by the enemy character 60, the physical strength parameter of the player character 50 decreases. When the physical strength parameter reaches "0", the player character 50 loses. Further, also to the enemy character icon 87, a physical strength display image indicating the physical strength parameter of the enemy character 60 is added. Also to an icon representing another character, a similar physical strength display image is added.

It should be noted that in the following figures, for ease of illustration, the display of a physical strength display image will occasionally be omitted in the map image 80.

Referring back to FIG. 3, the map image 80 includes a cursor icon 84 indicating the position of the cursor 70. The cursor icon 84 is an icon indicating the position of the cursor 70 in the virtual space. Specifically, the cursor icon 84 is placed in a section corresponding to a position indicated by the cursor 70 on the field in the virtual space. For example, in FIG. 2, the position indicated by the cursor 70 is located in a section diagonally forward right of the section of the player character 50. Thus, the cursor icon 84 is located at a section diagonally upward right of the player character icon 86.

Figure 5:
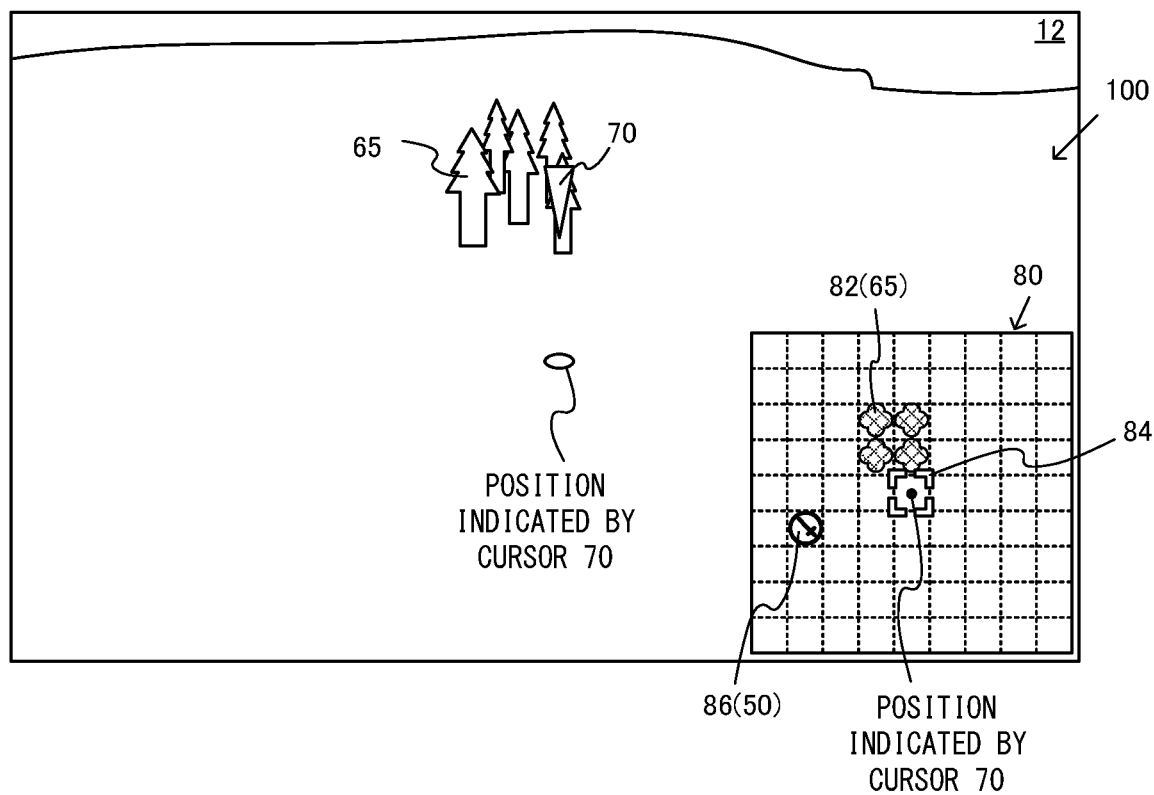
FIG. 5 is a diagram showing an example of an example non-limiting game image after a cursor 70 is moved in a right direction of a screen from a state in FIG. 2.

Here, the movement of the cursor 70 is described. FIG. 5 is a diagram showing an example of a game image after the cursor 70 is moved in the right direction of the screen from the state in FIG. 2.

In the exemplary embodiment, in accordance with a direction input operation of the user (e.g., the operation of tilting the analog stick 32), the cursor 70 moves in the virtual space, and the cursor icon 84 moves relative to the field image such that the input direction corresponds to a direction on the display screen. For example, the left-right direction of the analog stick 32 corresponds to a direction in the virtual space corresponding to the left and right on the screen, i.e., the left and right of the virtual camera in the virtual space, and the left-right direction of the map image 80. The up direction of the analog stick 32 corresponds to the depth direction of the virtual space and the up direction of the map image 80. It is intuitive that typically, the up direction of a direction input operation is defined as the up direction or the depth direction based on the manner of holding the controller. The cursor 70, however, moves on the field, and therefore, as a direction in the virtual space corresponding to the up direction or the depth direction of the virtual camera, the depth direction on the field is a direction in the virtual space corresponding to the input of the up direction. In accordance with the movement of the cursor 70, the virtual camera VC also moves. For example, the virtual camera VC is controlled so that the fixation point of the virtual camera VC coincides with the position indicated by the cursor 70 (or is near the indicated position). In other words, the virtual camera VC is controlled so that the cursor 70 is displayed almost in the center of the display screen 12.

For example, when the right direction of the analog stick 32 is input in the state in FIG. 2, then as shown in FIG. 5, the cursor 70 and the virtual camera VC move in the right direction. Thus, in the virtual space image 100, the enemy character 60 and the player character 50 move in the left direction of the screen, and are not displayed. Then, the forest object 65 is displayed approximately in the center in the left-right direction of the screen.

Figure 6:
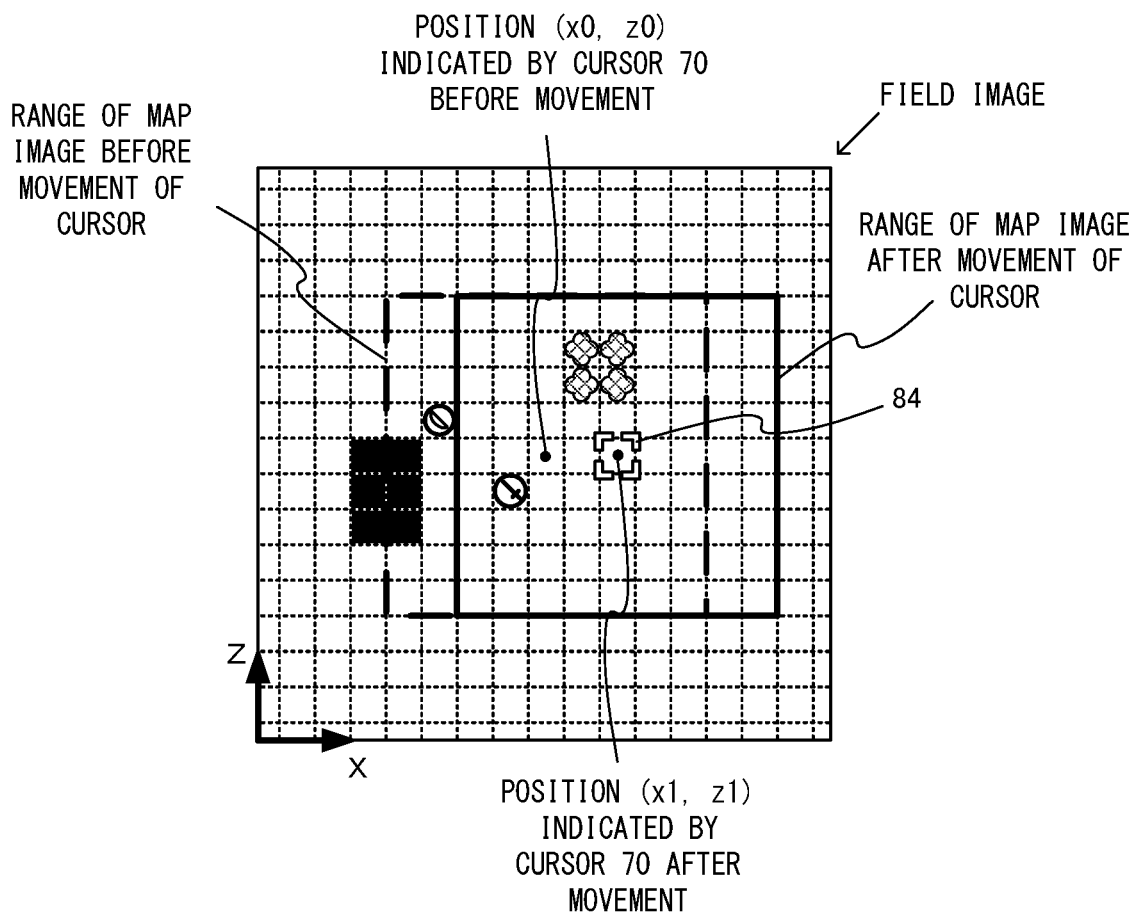
FIG. 6 is a diagram showing the range of an example non-limiting map image before and after the movement of the cursor 70.

In accordance with the movement of the cursor 70 (the virtual camera VC), the range of the field image included in the map image 80 also changes. FIG. 6 is a diagram showing the range of the map image before and after the movement of the cursor 70.

As shown in FIG. 6, when the position indicated by the cursor 70 is a position (x0, z0), a predetermined rectangular area (a thick dashed line portion in FIG. 6) centered on a position (x0, z0) on the field image is extracted from the field image, and a part of the extracted field image is displayed as the map image 80 on the display screen 12 (see FIG. 2).

Here, when the user inputs the right direction, the position indicated by the cursor 70 moves to (x1, z1). A predetermined area centered on the indicated position (x1, z1) after the movement is clipped, and a part of the clipped field image is displayed as the map image 80 on the display screen 12 (see FIG. 5). Then, the cursor icon 84 is placed in a section corresponding to the position indicated by the cursor 70. That is, the range of the field included in the map image 80 moves such that the cursor icon 84 is located at the center of the map image 80.

As described above, in accordance with the movement of the cursor 70 (the virtual camera VC), the range of the field included in the map image 80 is moved, and the map image is generated by including the field in the field of view of the virtual camera VC.

It should be noted that the cursor 70 also moves in the same section in the virtual space. That is, the cursor 70 can move to any position in the virtual space. In contrast, the cursor icon 84 of the map image 80 moves in section units. Thus, even when the cursor 70 moves in the virtual space, but if the movement is in the same section, the cursor icon 84 of the map image 80 does not move. Here, the position indicated by the cursor 70 coincides with the center of the map image 80. Thus, for example, when the cursor 70 moves in the right direction in the same section, the outer frame of the map image 80 slightly moves in the right direction. That is, the range of the field included in the map image 80 slightly moves in the right direction. Also in this case, the cursor 70 is located in the same section before and after the movement, and therefore, the section indicated by the cursor icon 84 of the map image 80 does not change.

It should be noted that the cursor 70 in the virtual space may also move in section units. Further, the position indicated by the cursor 70 in the virtual space and the center of the map image 80 may not necessarily need to coincide with each other.

Further, a terminal is defined in the field in the virtual space, and the player character 50 and the enemy character 60 are configured not to move beyond the terminal of the field. In this case, when the cursor 70 is present near the terminal, the center of the map image 80 may not need to coincide with the position indicated by the cursor 70. For example, the center position of the map image 80 may be appropriately adjusted so that the range where the player character 50 and the enemy character 60 can move is displayed near the center of the map image 80.

(Display of Movable Range Using Map Image)

Figure 7:
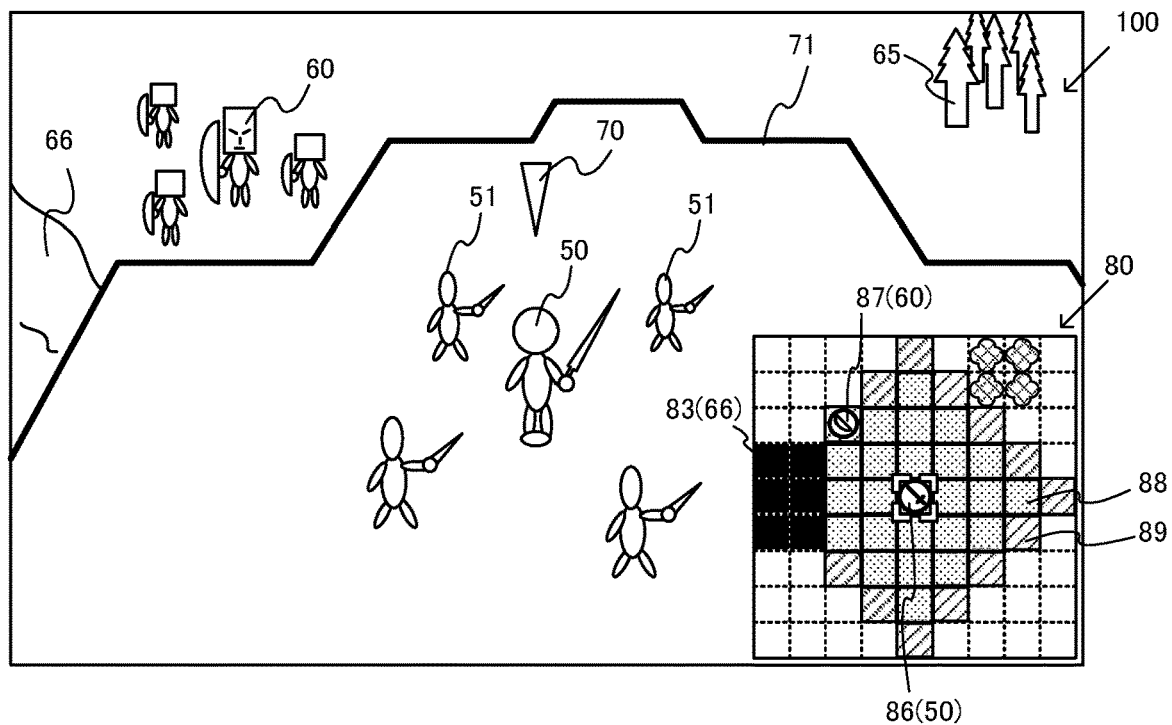
FIG. 7 is a diagram showing an example of an example non-limiting game image displayed when the cursor 70 is set to the position of a player character 50, and the player character 50 is selected.

Next, the display of the movable range of the player character 50 using the map image is described. FIG. 7 is a diagram showing an example of a game image displayed when the player character 50 is selected by setting the cursor 70 to the position of the player character 50.

As shown in FIG. 7, when the cursor 70 is at the position of the player character 50, a plurality of movable range images 88 indicating the movable range of the player character 50 are displayed in the map image 80. The movable range images 88 indicate that the player character 50 can move to the sections of the movable range images 88. The player character 50 can move only once in a single turn. The player character 50 can move to any section within the movable range indicated by the movable range images 88, while the player character 50 cannot move out of the movable range. Thus, to move the player character 50 out of the movable range indicated by the movable range images 88, the user needs to move the player character 50 in the current turn and further move the player character 50 in the next turn.

The movable range of the player character 50 is defined based on the type of the player character 50. For example, the movable range of the player character riding on a horse may be wider than the movable range of the player character 50 walking on foot.

Further, the movable range of the player character 50 may be determined based on a parameter of the player character 50. For example, the movable range of the player character 50 may be determined based on a movement strength parameter. The movement strength parameter is a parameter representing the amount at which the player character 50 can move at a time. In each section on the field, a movement consumption amount to be consumed when the player character 50 moves is defined. For example, when the player character 50 moves to the section where the forest object 65 is placed, the movement strength parameter of the player character 50 decreases by the movement consumption amount set in the section. Further, the movement consumption amount defined for the forest object 65 is set to be larger than flatland. Further, the player character 50 cannot move to the section where the enemy character 60 is placed or the section where a landform that cannot be entered by the player character 50 is placed. Based on the current movement strength parameter of the player character 50, the movement consumption amount set for each section, and whether or not each section can be entered, the movable range of the player character 50 is calculated. Then, the movable range images 88 are displayed in the calculated movable range.

In FIG. 7, the movable range images 88 are displayed in the range of a general rhomboid centered on the player character icon 86. Here, in the third section in the left direction of the player character icon 86, the rock icon 83 is placed. The player character 50 cannot move to the section where the rock icon 83 is placed. Thus, the movable range images 88 are not displayed in the section where the rock icon 83 is placed.

Further, in sections around the movable range images 88, attack-possible range images 89 indicating the attack-possible range of the player character 50 are displayed. The attack-possible range images 89 are images indicating the range where the player character 50 cannot move, but can make an attack. In the map image 80 in FIG. 7, the attack-possible range images 89 are displayed in the section where the enemy character icon 87 is located. Thus, the player character 50 can attack the enemy character 60. It should be noted that the attack-possible range varies depending on the type of the character. In the case of a character capable of making an attack in an adjacent section, the attack-possible range images 89 are displayed in a section adjacent to the movable range images 88. In the case of a character capable of making an attack in a distant section, the attack-possible range images 89 are further displayed in a wider range.

Further, images of the sections where the enemy character 60 can make an attack in a turn of the enemy side may be further displayed. Regarding all the enemy characters 60 or those specified among the enemy characters 60, based on the movement strength parameter, the landform, other placed characters, the attack firing range, and the like, all the sections where the enemy characters 60 can make an attack in a single action are calculated, and dangerous range images can be displayed in the map image 80 such that all the calculated sections are a dangerous range. However, taking into account that it is difficult to view the map in a case where the range is wide, only when the user gives a display instruction, the dangerous range images may be displayed. The dangerous range images are thus displayed, whereby, when the user moves the player character 50, it is easy to consider moving the player character 50 to the position where the player character 50 is not attacked in a turn of the enemy side, or moving the player character 50 to the position where the player character 50 is attacked in an advantageous state.

Further, as shown in FIG. 7, in the virtual space image 100, a range object 71 indicating the movable range of the player character 50 is displayed. The range object 71 indicates the range where the player character 50 can move. The range object 71 is placed on the field in the virtual space. The range object 71 corresponds to the outer edge of the movable range composed of the plurality of movable range images 88 in the map image 80. It should be noted that also in the virtual space image 100, in addition to the range object 71 indicating the movable range, images indicating the attack-possible range may be displayed.

Here, the movable range images 88 and the attack-possible range images 89 in the map image 80 are displayed when the cursor 70 moves to the position of the player character 50 (i.e., when the cursor 70 enters the section where the player character 50 is located). On the other hand, the range object 71 in the virtual space image 100 is displayed when a selection button (e.g., the operation buttons 41) is pressed by the user in a case where the cursor 70 is at the position of the player character 50.

It should be noted that the range object 71 in the virtual space image 100 may also be displayed when the cursor 70 enters the section where the player character 50 is located. Alternatively, the movable range images 88 and the attack-possible range images 89 in the map image 80 may be displayed when the cursor 70 is in the section where the player character 50 is located, and the selection button is pressed.

Further, in the map image 80, in addition to the movable range and the attack-possible range of the player character 50, movable range images 88 indicating the movable range of the enemy character 60 and attack-possible range images 89 indicating the attack-possible range of the enemy character 60 may be displayed. Similarly, in the virtual space image 100, an image indicating the movable range of the enemy character 60 and an image indicating the attack-possible range of the enemy character 60 may be displayed.

Further, an image of the range object 71 in the virtual space image 100 may not be a line image as shown in FIG. 7, but may be an image (a plane image) indicating each section on the field similarly to the movable range images 88 in the map image 80. The same applies to an image indicating the attack-possible range in the virtual space image 100.

Further, if the selection button (e.g., the operation buttons 41) is pressed by the user when the cursor 70 is at the position of the player character 50, the player character 50 (the leader) is displayed to be relatively large in the virtual space image 100. For example, when the player selects the player character 50 (presses the selection button) using the cursor 70, the plurality of soldier characters 51 are reduced. That is, before the player selects the player character 50 using the cursor 70, the player character 50 (the leader) and the plurality of soldier characters 51 are of almost the same sizes, or the player character 50 (the leader) is slightly larger than the plurality of soldier characters 51. When the player selects the player character 50 using the cursor 70, the plurality of soldier characters 51 are reduced, and the player character 50 (the leader) is displayed to be larger than the plurality of soldier characters 51. In other words, the differences in size between the player character 50 (the leader) and the plurality of soldier characters 51 when the player character 50 is selected are greater than the differences in size between the player character 50 (the leader) and the plurality of soldier characters 51 when the player character 50 is not selected. It should be noted that when the player selects the player character 50 using the cursor 70, the plurality of soldier characters 51 may not be reduced, but the player character 50 (the leader) may be enlarged. When the player character 50 is selected, the player character 50 (the leader) is displayed to be larger than the plurality of soldier characters 51, whereby it is easy for the player to recognize that the player character 50 is selected.

Further, in the exemplary embodiment, in the state where the virtual space image 100 and the map image 80 are displayed, the direction of the line of sight of the virtual camera VC can be set to a first direction in which the field in the virtual space is looked down on from obliquely above, and a second direction in which the field in the virtual space is viewed from the side. For example, the first direction may be the direction in which the direction of the line of sight of the virtual camera VC is 45 degrees to the field. Further, the second direction may be the direction in which the direction of the line of sight of the virtual camera VC is 10 to 20 degrees to the field. When the direction of the line of sight of the virtual camera VC is the first direction, the player character 50 (the leader) is larger than the plurality of soldier characters 51. On the other hand, when the direction of the line of sight of the virtual camera VC is the second direction, the player character 50 (the leader) is larger than the plurality of soldier characters 51, but the differences in size between the player character 50 (the leader) and the plurality of soldier characters 51 are smaller than in a case where the direction of the line of sight of the virtual camera VC is the first direction. Consequently, when the field is looked down on from above, it is possible to make the character as the leader for the player easily distinguishable.

Figure 8:
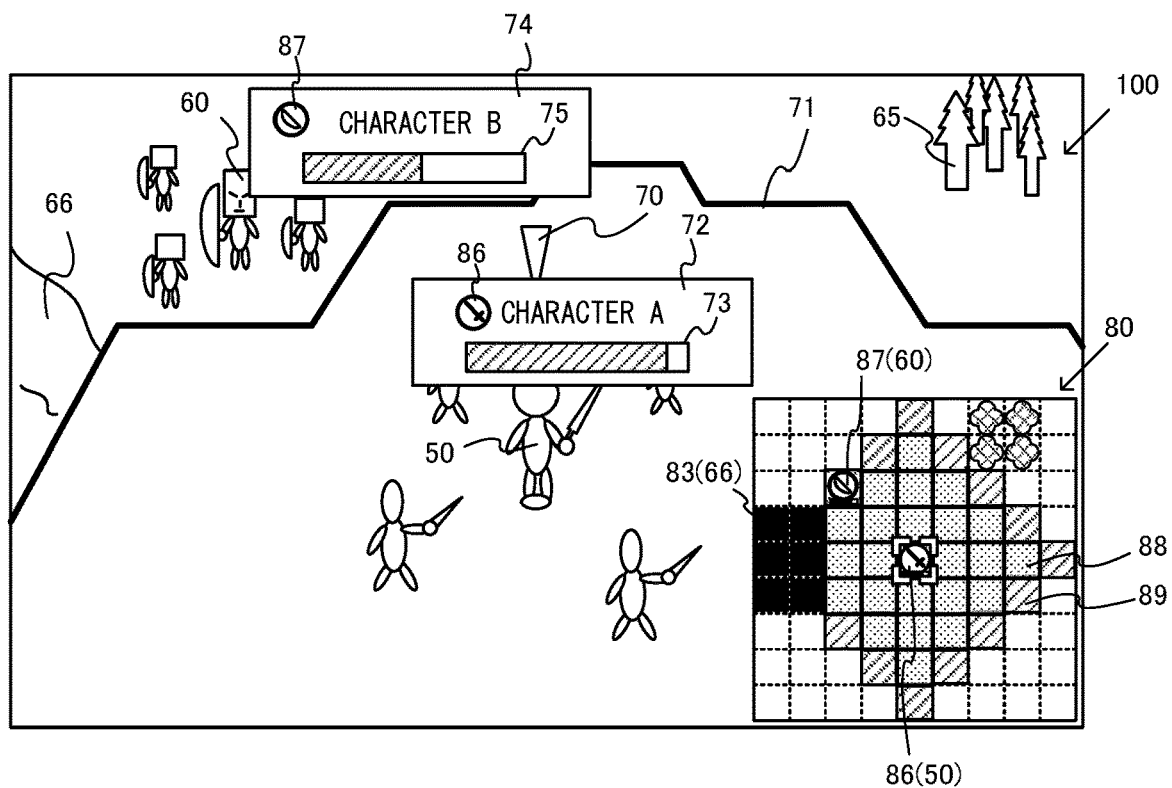
FIG. 8 is a diagram showing an example of an example non-limiting user interface indicating information regarding each character.

Here, in the virtual space, an information object indicating information regarding the name, the physical strength parameter, and the like of each character may be placed. FIG. 8 is a diagram showing an example of the information object indicating the information regarding each character.

As shown in FIG. 8, an information object 72 indicating information regarding the player character 50 is placed near the player character 50. The information object 72 is an object placed in the virtual space. When the information object 72 is included in the field of view of the virtual camera VC, the information object 72 is displayed in the virtual space image 100 based on the virtual camera VC. The information object 72 includes the name of the player character 50, an image indicating the type of the player character 50 (the same image as the player character icon 86), and a physical strength display image 73. The physical strength display image 73 is an image indicating the physical strength parameter of the player character 50. The information object 72 may include information regarding another parameter in addition to these pieces of information.

Further, an information object 74 indicating information regarding the enemy character 60 is also placed near the enemy character 60. The information object 74 includes the name of the enemy character 60, an image indicating the type of the enemy character 60 (the same image as the enemy character icon 87), and a physical strength display image 75. The physical strength display image 75 is an image indicating the physical strength parameter of the enemy character 60. In addition to these pieces of information, various pieces of information may be displayed in the virtual space image 100. For example, information indicating the current field, information indicating the level of the player character 50, and the like may be displayed.

As described above, in the virtual space image 100, an information object is displayed in a superimposed manner on the player character 50, the enemy character 60, or the like. The information object indicates information necessary for the user and is also information necessary for the progress of the game. However, there is a possibility that the player character 50, the enemy character 60, the cursor 70, or the like placed in the virtual space is hidden by the information object, and it is difficult for the user to visually recognize the situation of the virtual space. In the exemplary embodiment, however, the map image 80 is displayed. Thus, the user can visually recognize the situation of the virtual space based on the map image 80 and advance the game. It should be noted that the information object may be set to be a hidden state at default and displayed in accordance with an operation of the player.

It should be noted that in the following figures, for description, the display of the information objects 72 and 74 shown in FIG. 8 is omitted.

(Display of Map Image when Direction of Virtual Camera Changes)

Figure 9:
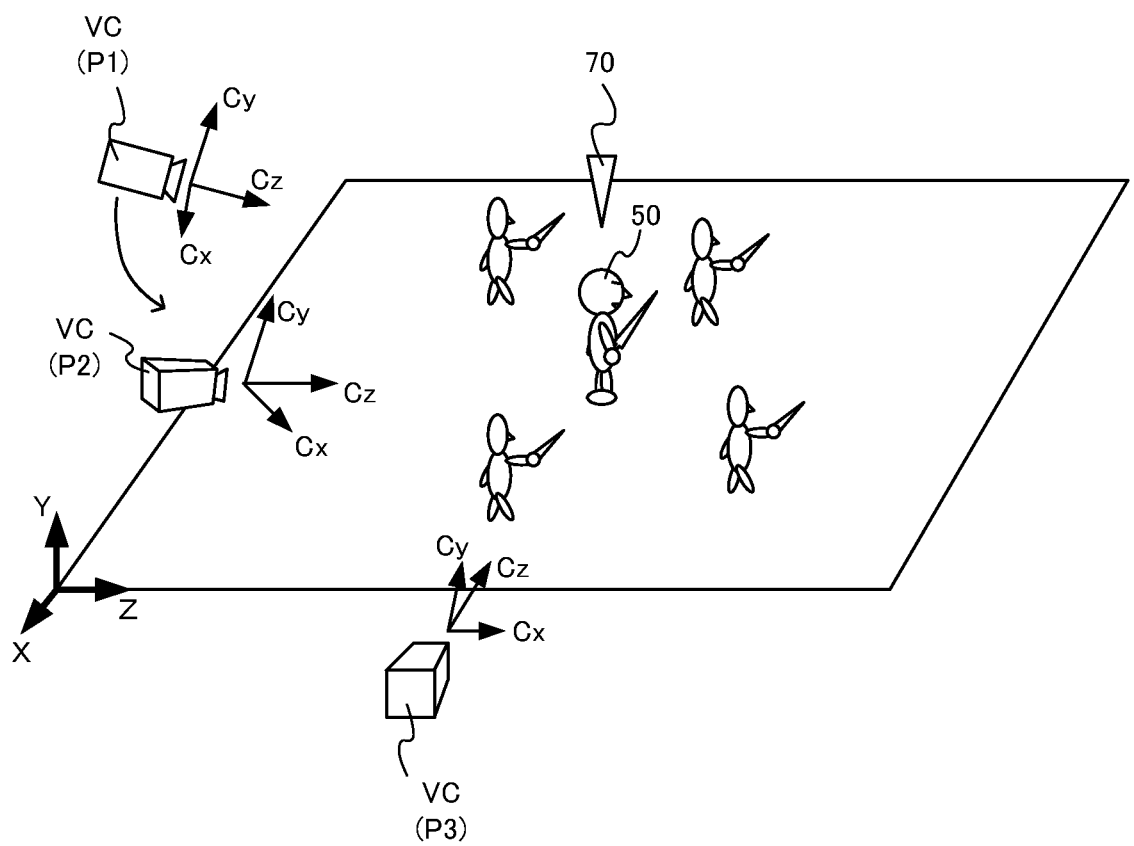
FIG. 9 is an example non-limiting diagram showing the state where the direction of a virtual camera VC changes.

Next, a description is given of the display of the map image when the direction of the virtual camera VC changes. First, with reference to FIG. 9, control of the virtual camera VC in the virtual space is described. FIG. 9 is a diagram showing the state where the direction of the virtual camera VC changes.

As shown in FIG. 9, for the virtual camera VC, a camera coordinate system (a CxCyCz coordinate system) fixed to the virtual camera VC is set. The Cz-axis is an axis in the direction (the direction of the line of sight) of the virtual camera VC. The Cy-axis is an axis orthogonal to the Cz-axis and is also an axis in the up direction of the virtual camera VC. The Cx-axis is an axis orthogonal to the Cy-axis and the Cz-axis and is also an axis in the right direction of the virtual camera VC.

For example, when the user inputs a predetermined direction using the analog stick 42, the virtual camera VC rotates about the cursor 70. When the virtual camera VC is at a position P1, the game image shown in FIG. 7 is displayed. At this time, for example, when the analog stick 42 is tilted in the left direction, the virtual camera VC rotates in the left direction by an angle corresponding to the tilt amount about a straight line passing through the position indicated by the cursor 70 and parallel to the Y-axis. For example, the virtual camera VC moves from the position P1 immediately behind the player character 50 to a position P2 diagonally backward right of the player character 50. When the analog stick 42 is tilted to the right, the virtual camera VC is directed to the right and moves to the left. It should be noted that the perception of the association between the input of the stick and the direction of the virtual camera varies from individual to individual. Thus, in another example, conversely, in accordance with the input of the left, the virtual camera may be directed to the right and move to the left. Further, the user may be allowed to, by a setting, specify which association is to be used.

Figure 10:
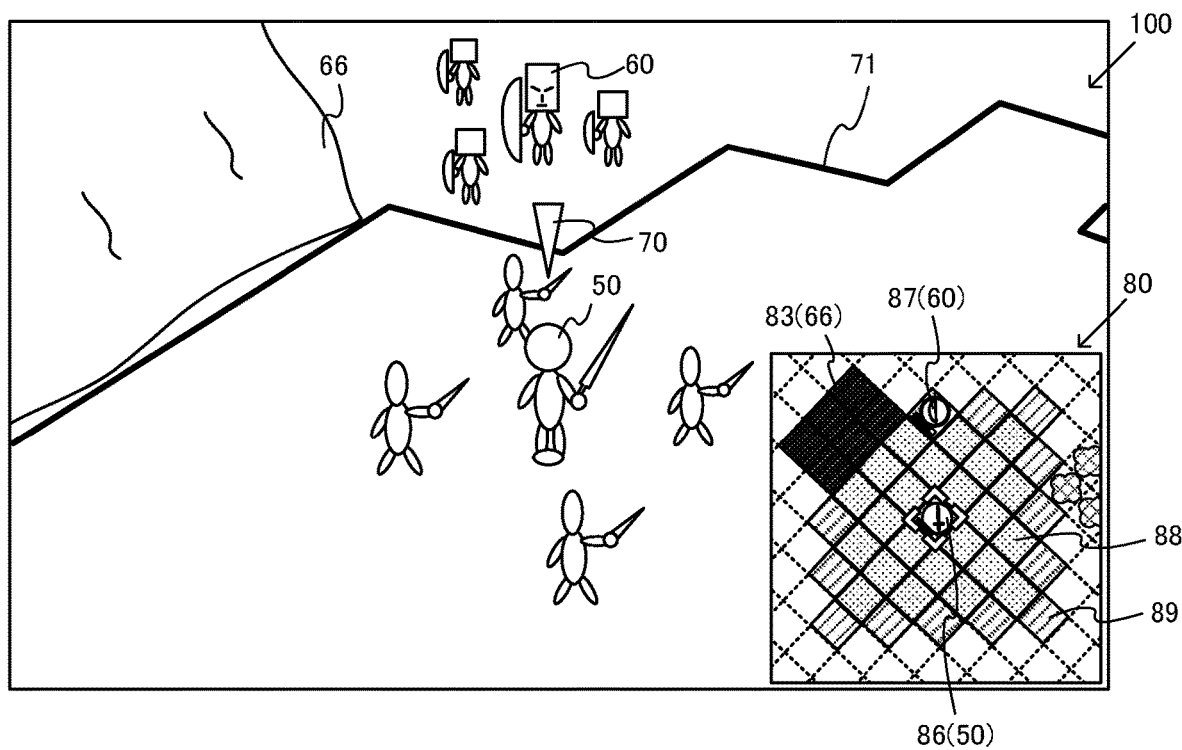
FIG. 10 is a diagram showing an example of an example non-limiting game image when the virtual camera VC is at a position P2 shown in FIG. 9.

FIG. 10 is a diagram showing an example of a game image when the virtual camera VC is at the position P2 shown in FIG. 9.

As shown in FIG. 10, when the virtual camera VC is at the position P2, the enemy character 60 is located in the direction of the line of sight of the virtual camera VC, and the enemy character 60 is displayed in a center area in an upper portion of the display screen 12. Further, the rock object 66 is located on the left side in the direction of the line of sight of the virtual camera VC, and the rock object 66 is displayed in a left area of the virtual space image 100.

At this time, as the map image 80, an image in which the entirety of the field rotates is displayed. Specifically, the field image included in the map image 80 rotates such that the direction along the field in the direction of the virtual camera VC corresponds to the up direction of the map image 80. Thus, in the up direction of the player character icon 86 in the map image 80, the enemy character icon 87 is displayed.

Figure 11:
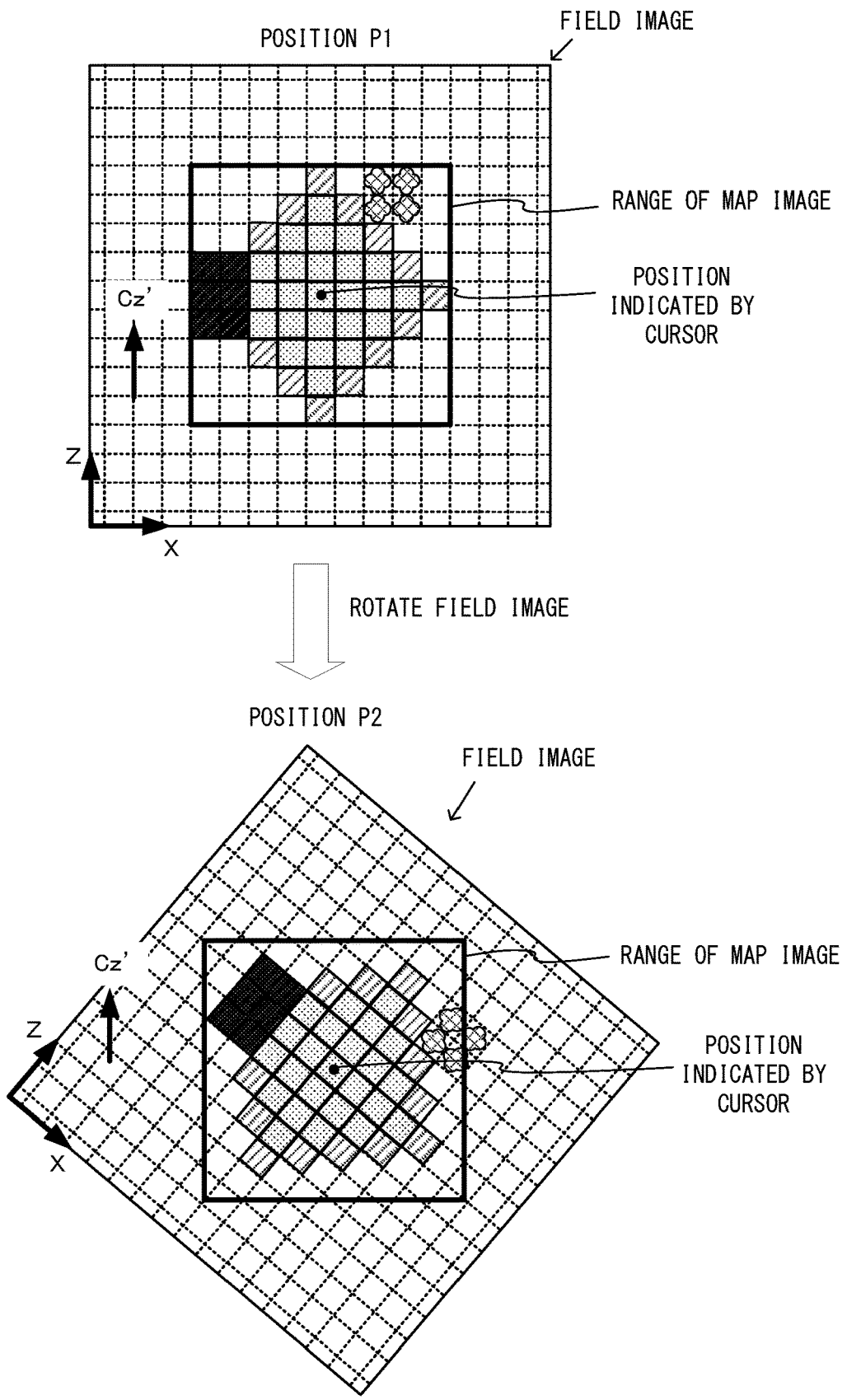
FIG. 11 is a diagram illustrating the generation of the example non-limiting map image 80 when the virtual camera VC changes from a position P1 to the position P2.

Here, the generation of the map image 80 is described. FIG. 11 is a diagram illustrating the generation of the map image 80 when the virtual camera VC changes from the position P1 to the position P2.

As shown in FIG. 11, when the virtual camera VC is at the position P1, the direction of a vector Cz' obtained by projecting a vector Cz indicating the direction of the virtual camera VC onto the XZ plane, and the Z-axis direction of the field image coincide with each other. From this field image, a predetermined area centered on the position indicated by the cursor is clipped, thereby generating the map image 80.

On the other hand, when the virtual camera VC moves to the position P2, the field image is rotated such that the direction of the vector Cz' along the XZ plane in the direction of the line of sight of the virtual camera VC coincides with the up direction of the map image 80 (the up direction when the map image is displayed). For example, the angle between the vector Cz' and a vector in the Z-axis direction is calculated, and the direction of the range of the map image relative to the field image is set based on the calculated angle. Then, a predetermined area which is centered on the position indicated by the cursor and of which the direction is changed is extracted from the field image, thereby generating the map image 80 rotated further than before the movement.

It should be noted that the position of the virtual camera VC continuously changes from the position P1 to the position P2 for a predetermined time. Thus, in the middle of the movement of the virtual camera VC from the position P1 to the position P2, the middle of the state where FIG. 7 changes to FIG. 10 is displayed. That is, it seems as if the display content of the map image 80 rotates.

Further, not only by the above method for calculating the vector Cz', but also by another method, the up direction of the map image when the map image is displayed may correspond to the direction along the field in the direction of the virtual camera VC.

Here, the field in the virtual space may be composed not only of a complete plane, but also of an uneven surface or a partially inclined surface. Also in such a case where the field in the virtual space is not a complete plane, the entirety of the field can be regarded as a plane except for an uneven portion or an inclined portion. Thus, "the direction along the field in the direction of the virtual camera VC" is the direction along the plane in the direction of the virtual camera VC, and specifically, can be said to be the vector Cz'. Further, the cursor 70 can move parallel to the XZ plane in FIG. 9. However, when the height of the ground changes due to the unevenness of the landform, the height of the cursor 70 may change in accordance with the height of the ground when the cursor 70 moves.

If the left direction is further input when the virtual camera VC is at the position P2, the virtual camera VC further rotates and moves to a position P3 on the right side of the player character 50 (see FIG. 9).

Figure 12:
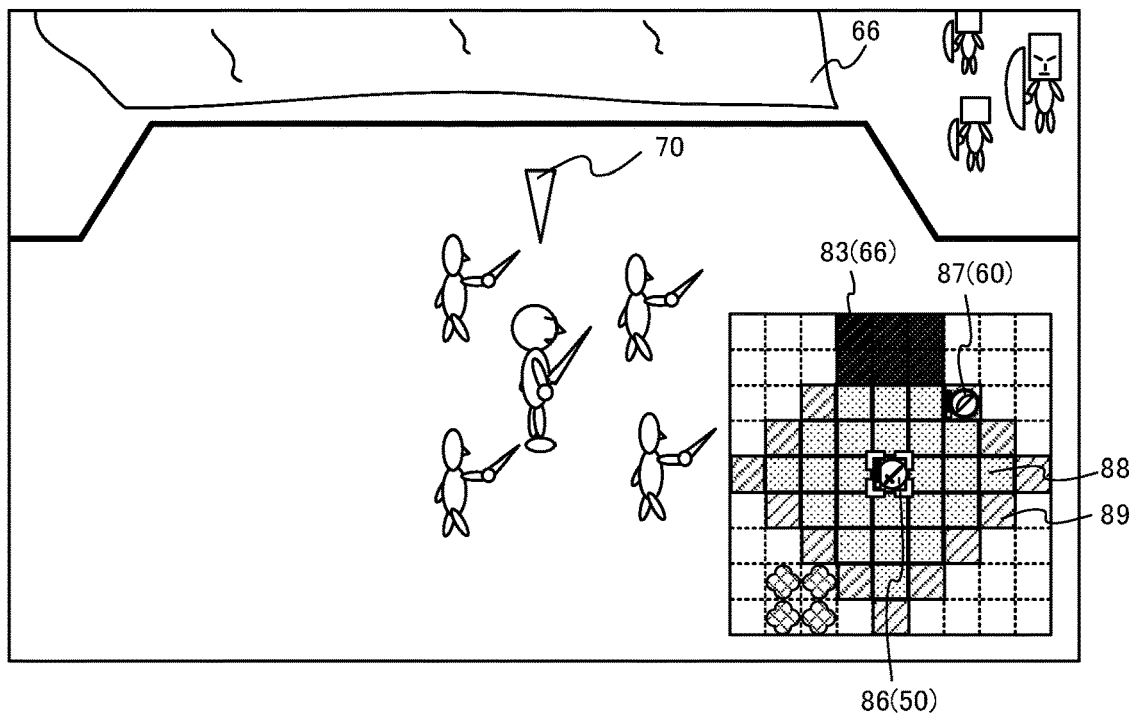
FIG. 12 is a diagram showing an example of an example non-limiting game image when the virtual camera VC is at a position P3 shown in FIG. 9.

FIG. 12 is a diagram showing an example of a game image when the virtual camera VC is at the position P3 shown in FIG. 9.

As shown in FIG. 12, when the virtual camera VC is at the position P3, the rock object 66 is located in the direction of the line of sight of the virtual camera VC. At this time, as the map image 80, an image obtained by further rotating the image representing the field from FIG. 10 is displayed. Specifically, the field image included in the map image 80 rotates such that the up direction of the map image 80 corresponds to the direction along the field in the direction of the virtual camera VC. Thus, the rock icon 83 is displayed in the up direction of the player character icon 86 of the map image 80.

As described above, when the direction of the virtual camera VC changes, the field image included in the map image 80 rotates such that the direction along the field in the direction of the virtual camera VC corresponds to the up direction of the map image. Consequently, the up direction of the map image displayed on the display screen 12 always coincides with the direction along the field in the direction of the virtual camera VC. Further, for example, the right direction of the virtual space image 100 corresponds to the right direction of the map image 80, and the left direction of the virtual space image 100 corresponds to the left direction of the map image 80. Thus, by viewing the map image 80, the user can easily grasp the positional relationship between the player character 50 and the enemy character 60 on the field and the situation of the field (e.g., a battle situation).

Further, also in the state where the direction of the virtual camera VC thus changes, then in accordance with a direction input operation of the user (e.g., the operation of tilting the analog stick 32), the cursor 70 moves in the virtual space such that the input direction and the direction on the display screen correspond to each other, and the cursor icon 84 moves relative to the field image. That is, regardless of the direction of the virtual camera VC, it is possible to move the cursor 70 and the cursor icon 84 in the displayed direction.

In the map image 80, the movable range images 88 indicating the movable range of the player character 50 are displayed. Thus, by viewing at least the map image 80, the user can easily recognize to which section the player character 50 can move and which enemy character 60 the player character 50 can attack, thereby advancing the game. Further, the user can advance the game by viewing the map image 80 and can also view the field in the virtual space from the user's desired viewpoint by changing the direction of the virtual camera. Further, the direction of the virtual camera VC and the direction of the field image included in the map image 80 are displayed on a single screen in conjunction with each other. Thus, the user does not need to switch the map image 80 and the virtual space image 100 and can smoothly advance the game.

Further, the player character 50 is displayed in a form (a group display form) in which the plurality of soldier characters 51 are included, and the enemy character 60 is also displayed in a form (a group display form) in which the plurality of soldier characters 61 are included. Thus, it is possible to improve appearance in a game where groups fight against each other, and increase a realistic feeling. Meanwhile, when the player character 50 and the enemy character 60 are thus displayed in the group display forms, and if the player character 50 and the enemy character 60 are adjacent to each other, for example, there is a possibility that it is difficult to distinguish whether a soldier character is a character in the group on the player character 50 side or a character in the group on the enemy character 60 side. However, even in such a case, by viewing the map image, the user can grasp the boundary between the player character 50 (the small group) and the enemy character 60 (the small group). Further, when the virtual camera VC comes so close that the player character 50 and the plurality of soldier characters 51 can be displayed, it can be difficult to grasp the surroundings due to the narrow field of view. However, also in this case, necessary information regarding the surroundings is displayed on the map image 80. Thus, it is possible to grasp the surroundings. The moving direction of the cursor 70 is a direction on display and further operates in conjunction with a direction on the map image. Thus, by viewing the map image 80, it is possible to move the cursor 70 even in the situation where it is difficult to view the surroundings. Thus, it is possible to pay attention to the animation of a character and the like while displaying necessary information.

(Display of Movement Path)

Figure 13:
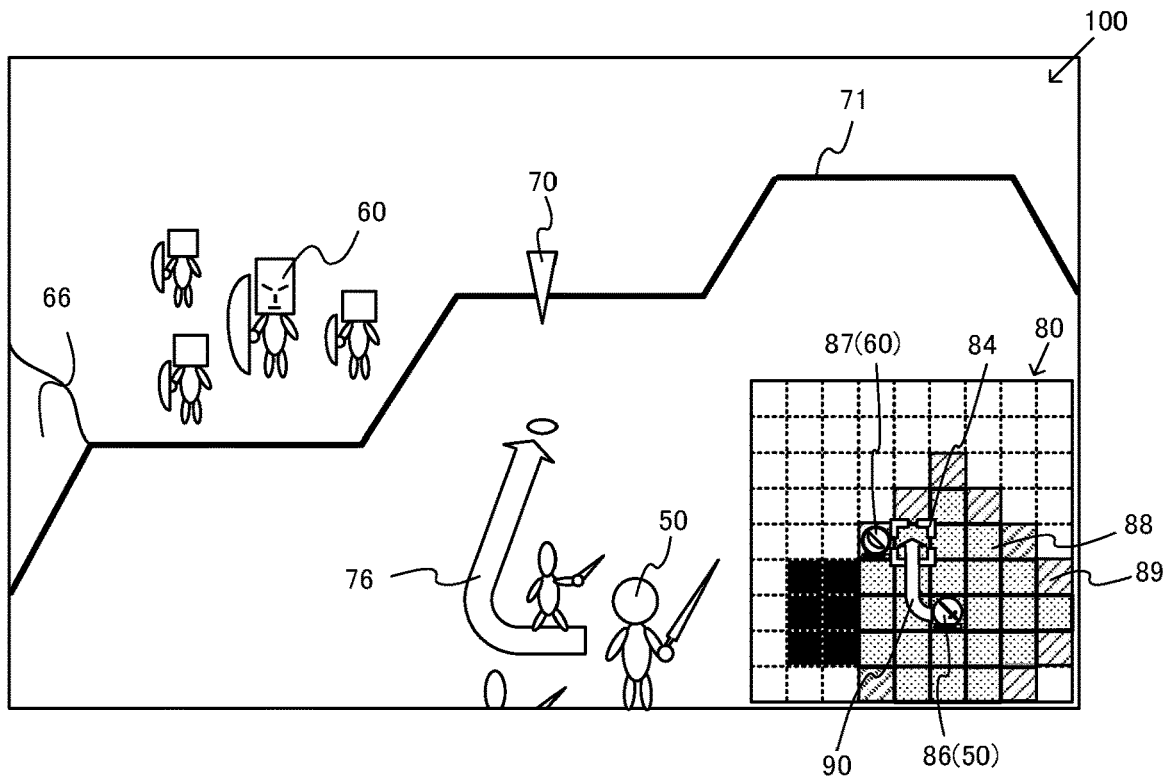
FIG. 13 is a diagram showing an example of an example non-limiting game image when the cursor 70 moves in a state shown in FIG. 7.

Next, the display of a movement path is described. FIG. 13 is a diagram showing an example of a game image when the cursor 70 is moved in the state shown in FIG. 7.

When the user sets the cursor 70 to the player character 50 and presses the selection button (e.g., any of the plurality of operation buttons 41), the player character 50 is selected. Alternatively, every time the user gives a predetermined instruction (e.g., presses any of the plurality of operation buttons 41), one of the plurality of player characters 50 may be selected in order, and the cursor 70 may move to the position of the selected player character 50. In the state where the player character 50 is selected, the user indicates a section as the movement destination of the player character 50 using the cursor 70.

As shown in FIG. 13, when the cursor 70 is moved in the state where the player character 50 is selected, a path image 90 is displayed in the map image 80. The path image 90 is an image indicating the path from the section before the movement of the player character 50 to the section as the movement destination. The path image 90 is an arrow image of which the starting point is the section before the movement (the section where the player character 50 is currently located), and the ending point is the section as the movement destination (the section where the cursor 70 is currently located).

Further, on the field in the virtual space, a path object 76 indicating the path from the section before the movement to the section as the movement destination of the player character 50 is placed. The path object 76 is an arrow object of which the starting point is the position of the player character 50 before the movement, and the ending point is the position of the player character 50 at the movement destination. The virtual space including the path object 76 is captured by the virtual camera VC, whereby the path object 76 is displayed on the virtual space image 100.

Then, when the cursor 70 indicates the section as the movement destination, and if a determination button for finalizing the movement or the attack (e.g., any of the operation buttons 41) is pressed, the player character 50 moves to the section indicated by the cursor 70. Further, when the enemy character 60 is present in the section indicated by the cursor 70, the player character 50 attacks the enemy character 60. In the example of FIG. 13, the cursor 70 indicates a section to the right of the enemy character 60. Thus, when the determination button is pressed in this state, the player character 50 moves to the section to the right of the enemy character 60. Then, it is possible to further give an instruction to attack the enemy character 60. When the instruction is given, the player character 50 attacks the enemy character 60. If the determination button is pressed when the section of the enemy character 60 is directly indicated using the cursor 70, the player character 50 moves close to the enemy character 60 (a section within the movable range) and immediately attacks the enemy character 60. It should be noted that in the virtual space image 100, the range object 71 may be displayed, while the path object 76 may not be displayed.

In FIG. 13, when the player character 50 is selected, and the cursor 70 moves before the determination button is pressed, only the cursor 70 moves in the virtual space image 100. When the player character 50 is selected, and the cursor 70 moves before the determination button is pressed, the player character 50 may also move together with the cursor 70 in the virtual space image 100.

Figure 14:
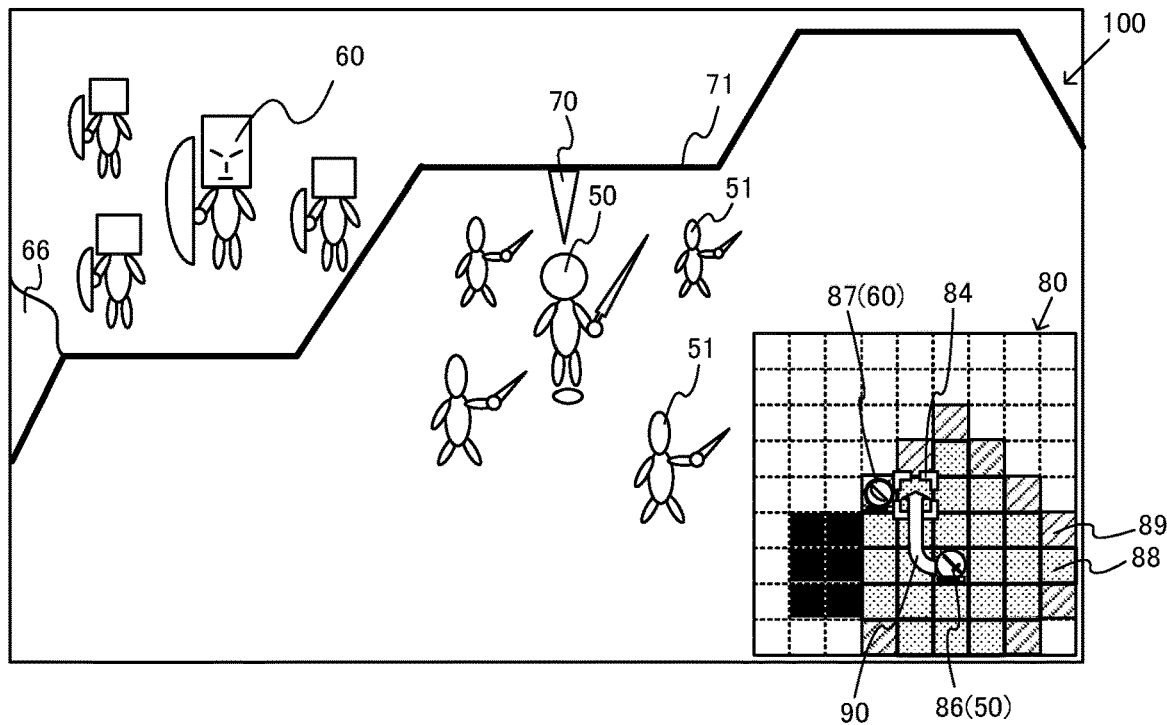
FIG. 14 is an example non-limiting diagram showing an example of the state where, when the player character 50 is selected, the player character 50 moves in a virtual space in accordance with a movement operation of a player.
Figure 15:
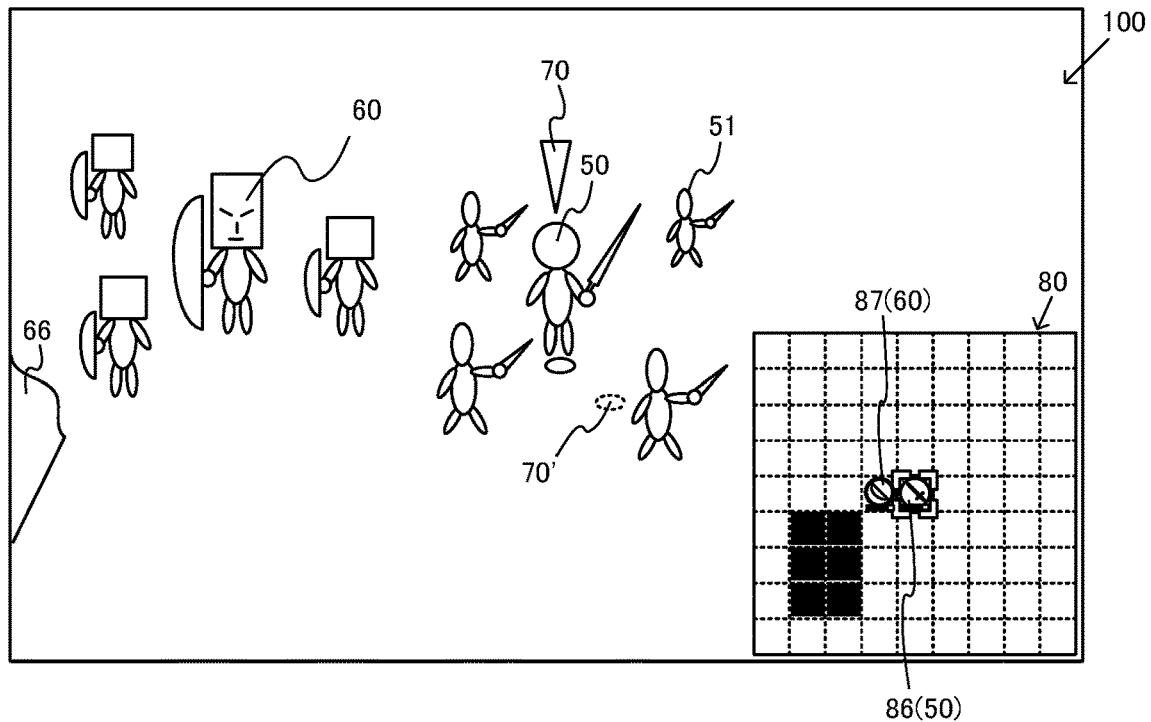
FIG. 15 is a diagram showing an example of an example non-limiting image when a determination button for finalizing a movement or an attack is pressed in a case where the image shown in FIG. 14 is displayed.

FIG. 14 is a diagram showing an example of the state where, when the player character 50 is selected, the player character 50 moves in the virtual space in accordance with a movement operation of the player. FIG. 15 is a diagram showing an example of an image when the determination button for finalizing the movement or the attack is pressed in a case where the image shown in FIG. 14 is displayed.

As shown in FIG. 14, after the player selects the player character 50 and before the player presses the determination button, the player character 50 (the leader) and the cursor 70 freely move within the movable range in the virtual space image 100, for example, in accordance with an operation on the analog stick 32. The virtual camera VC moves in the virtual space in accordance with the movements of the cursor 70 and the player character 50 (the leader). Further, the plurality of soldier characters 51 move following the movement of the player character 50 (the leader). While the player character 50 (the leader) moves, the plurality of soldier characters 51 move slightly behind the player character 50 (the leader) by following the player character 50 (the leader).

Before the determination button is pressed, and even when the player character 50 moves in the virtual space image 100, the player character icon 86 does not move in the map image 80. That is, until the operation of finalizing the movement is performed, the position of the player character icon 86 in the map image 80 does not change. In the map image 80, the path image 90 is displayed. The path image 90 indicates the path from the section before the movement (the current position of the player character icon 86) to the section as the movement destination (the section where the cursor icon 84 is located; the section corresponding to the position of the player character 50 in the current virtual space image 100).

It should be noted that when a cancellation button indicating the cancellation of the movement is pressed in the state where the image indicated in FIG. 14 is displayed, then in the virtual space image 100, the player character 50 and the cursor 70 return to a predetermined position in the section before the movement (e.g., the center of the section). In this case, the player character 50 (the leader) and the cursor 70 instantly return to the predetermined position in the section before the movement. In accordance with the movements of the player character 50 and the cursor 70, the fixation point of the virtual camera VC also instantly returns to the previous position. Thus, in the virtual space image 100, a scene corresponding to the section as the movement destination instantly switches to a scene corresponding to the section before the movement. Meanwhile, the plurality of soldier characters 51 return into the section before the movement behind the player character 50 (the leader) by following the player character 50 (the leader). Even before the plurality of soldier characters 51 completely return into the section before the movement, the player character 50 (the leader) can move in accordance with an operation on the analog stick 32. That is, even while the plurality of soldier characters 51 move toward the section before the movement in accordance with the pressing of the cancellation button, the player character 50 (the leader) starts moving from the predetermined position in the section before the movement in accordance with an operation on the analog stick 32. That is, the plurality of soldier characters 51 always continue to move from the current position to a predetermined position relative to the player character 50 (the leader).

The plurality of soldier characters 51 continue to move following the player character 50 (the leader). Thus, even when the player character 50 (the leader) and the fixation point of the virtual camera VC instantly return to the previous position in accordance with the pressing of the cancellation button, it is possible to avoid giving the player a sense of interruption of the scene. Further, the plurality of soldier characters 51 automatically move following the player character 50 (the leader). Thus, the player does not need to control the movement of the plurality of soldier characters 51. It is possible to efficiently advance the game.

When the determination button for finalizing the movement or the attack is pressed in the state shown in FIG. 14, the image shown in FIG. 15 is displayed. As shown in FIG. 15, at the timing when the determination button is pressed, the player character 50 (the leader) moves to the predetermined position in the section (e.g., the center in the section) where the player character 50 (the leader) is currently located in the virtual space image 100. In FIG. 15, a position 70' indicates the position indicated by the cursor, i.e., the position of the player character 50 (the leader), immediately before the determination button is pressed. As described above, before the determination button is pressed, the cursor 70 and the player character 50 (the leader) can move to any position in the section. There is a case where the player character 50 (the leader) immediately before the determination button is pressed is placed at a position different from the predetermined position in the section where the player character 50 (the leader) is located. In this case, at the timing when the determination button is pressed, the cursor 70 and the player character 50 (the leader) move to the predetermined position in the section. The plurality of soldier characters 51 also move following the movement of the player character 50 (the leader). Further, in the map image 80, the player character icon 86 moves to the section as the movement destination (the section where the cursor icon 84 is located; the section indicated by the end of the arrow of the path image 90) in accordance with the pressing of the determination button. It should be noted that at the time when the determination button for finalizing the movement or the attack is pressed, the position of the player character 50 (the leader) may not be moved, and the position of the player character 50 (the leader) may be moved to the predetermined position in the section after a battle, when cancellation is made, when the viewpoint is switched, or the like.

Consequently, the movement of the player character 50 in section units is completed. It should be noted that when the determination button is pressed, the selection of the player character 50 is canceled. Thus, in the map image 80, the movable range images 88 and the attack-possible range images 89 are hidden.

As described above, after the player character 50 is selected using the cursor 70 and before the determination button is pressed, the cursor 70 and the player character 50 may be able to freely move within the movable range in accordance with an operation of the player. Then, in accordance with the pressing of the determination button, the player character 50 may move to a predetermined position in the section where the player character 50 is currently located, and the movement of the player character 50 in section units may be completed. It can be said that the positions of the cursor 70 and the player character 50 before the determination button is pressed are an indicated position indicating the section as the movement destination of the player character 50 to be finalized when the determination button is pressed. That is, it can be said that to freely move the player character 50 within the movable range of the player character 50 in the virtual space image 100 is to indicate the section as the movement destination of the player character 50. Thus, when the player character 50 moves in the virtual space image 100 before the determination button is pressed, the cursor 70 may not need to be displayed. In this case, the cursor icon 84 may not need to be displayed in the map image 80, either. Even when the cursor icon 84 is not displayed in the map image 80, the player can recognize the section before the movement and the section as the movement destination based on the path image 90.

In such a movement form, it is possible to proceed to the next game scene (e.g., an attack on the enemy character 60, the movement of the enemy character 60, or the like) more quickly than in a case where only the cursor 70 moves before the pressing of the determination button as described with reference to FIG. 13. Further, when only the cursor 70 moves before the pressing of the determination button, and the player character 50 moves in accordance with the pressing of the determination button, it is necessary to determine in what path the player character 50 is moved from the starting point to the ending point. For example, when there is an obstacle between the starting point and the ending point, it is necessary to determine a path making a detour around the obstacle. Further, when the player character 50 is linearly moved from the starting point to the ending point without making such a detour, and an obstacle is present in the path from the starting point to the ending point, this can result in an unnatural appearance such as the player character 50 moving through the obstacle or the virtual camera VC hitting the obstacle. However, as shown in FIGS. 14 and 15, also in the game based on the premise that the player character 50 moves in section units in the field, then by freely moving the player character 50 before the determination button is pressed, it is possible to reduce such an unnatural appearance.

Further, even when the player character 50 is moved before the pressing of the determination button, the player character icon 86 does not move in the map image 80, and the cursor icon 84 and the path image 90 are also displayed. Thus, the player can grasp from where to where the player character 50 is to move.

As described above, in the exemplary embodiment, on the display screen 12, the map image 80 is displayed in addition to the virtual space image 100. The player character 50 moves in section (grid) units obtained by dividing the field in the virtual space into predetermined areas. The map image 80 includes the image representing the field in the virtual space, the player character icon 86 representing the player character 50, the section images 85 indicating the sections set in the field, and the movable range images 88 indicating the movable range of the player character 50 regarding the movement in section units. Since the map image including the image representing the field divided by the section images, the player character icon, and the movable range image is displayed, the user can advance the game by viewing at least the map image 80.

The movement of the player character 50 in section units as used herein refers to, for example, a movement to a final movement destination in a case where the operation of finalizing the movement is performed. If the final movement is made in section units, then before the final movement is made, the player character 50 may be able to freely move in the field as shown in FIG. 14. For example, before a finalization operation is performed, the player character 50 may be able to move to any position in the movable range, and in accordance with the fact that the finalization operation is performed, the movement of the player character 50 in section units may be finalized.

Further, when the direction of the virtual camera VC changes, the image representing the field included in the map image 80 rotates such that the up direction of the map image 80 when the map image 80 is displayed on the display screen 12 corresponds to the direction along the field in the direction of the virtual camera VC. Consequently, based on the map image 80, the user can easily grasp the positional relationship between the player character 50 and the enemy character 60 or a battle situation.

Further, while the virtual space image 100 and the map image 80 are displayed on a single screen, the movable range images 88 regarding the movement in section units are displayed in the map image 80, and further, the direction of the line of sight of the virtual camera VC and the up direction of the map image are caused to correspond to each other, thereby obtaining the following effect. That is, by viewing at least the map image 80, the user can advance a game where the player character 50 is moved in section units. Further, by viewing the virtual space image 100 on the same screen, the user can view the more detailed situation of the virtual space. Further, since the virtual space image 100 and the map image 80 are displayed on a single screen, it is not necessary to switch screens, and it is possible to smoothly advance the game.

It should be noted that in the exemplary embodiment, in addition to the above mode where the virtual space image 100 and the map image 80 are displayed, the game can also be executed in the mode where the map image 80 is not displayed. Specifically, the virtual camera VC is zoomed in, the game image including the virtual space image 100 and the map image 80 shown in FIG. 7 or the like is displayed. When the virtual camera VC is zoomed out, only an image of the virtual space is displayed.

Figure 16:
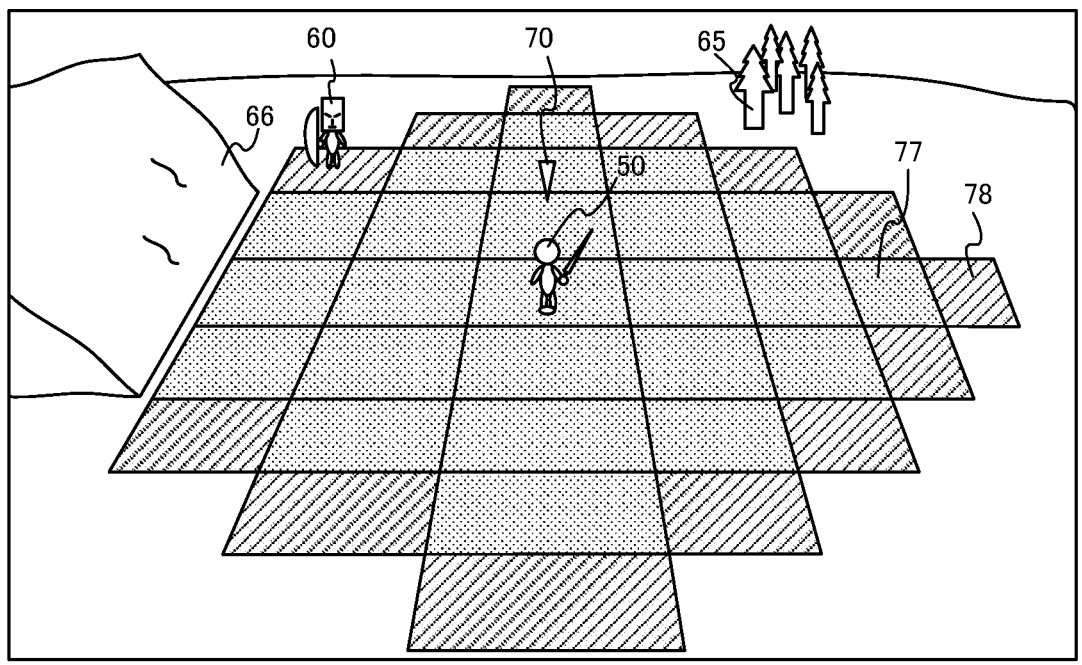
FIG. 16 is a diagram showing an example of an example non-limiting game image when the virtual camera VC is zoomed out at the position of the virtual camera VC shown in FIG. 7.

FIG. 16 is a diagram showing an example of a game image when the virtual camera VC is zoomed out at the position of the virtual camera VC shown in FIG. 7.

In accordance with an operation of the user, a zoom-in mode shown in FIG. 7 switches to a zoom-out mode shown in FIG. 16. As shown in FIG. 16, when the virtual camera VC is zoomed out, an image based on the virtual camera VC that is also an image of the range of the field wider than when the virtual camera VC is zoomed in is displayed on the display screen 12. Meanwhile, the map image 80 is not displayed. Further, when the virtual camera VC is zoomed out, the soldier characters 51 around the player character 50 are not displayed. Similarly, the soldier characters 61 around the enemy character 60 are not displayed, either. Further, on the field in the virtual space, a plurality of range objects 77 indicating the movable range of the player character 50 are placed. Each range object 77 indicates a section where the player character 50 can move. When the user moves the player character 50 on this screen, the user sets the cursor 70 to the player character 50 and presses the selection button. Then, the user moves the cursor 70 to a section as the movement destination and presses the determination button. As a result, the player character 50 moves to the section indicated by the cursor 70. Further, a plurality of attack range objects 78 indicating the attack-possible range of the player character 50 are displayed. To cause the player character 50 to attack the enemy character 60, the user sets the cursor 70 to the player character 50 and presses the selection button. Then, the user moves the cursor 70 to the section where the enemy character 60 is located. Then, the user presses the determination button. As a result, the player character 50 moves close to the enemy character 60 and attacks the enemy character 60.

It should be noted that when the virtual camera VC is zoomed out, the range object 71 (the line object) as in FIG. 7 may be displayed instead of the range objects 77.

Further, in accordance with an operation of the user, the zoom-in mode shown in FIG. 7 may instantly switch to the zoom-out mode shown in FIG. 16. Further, the zoom-in mode shown in FIG. 7 may gradually change to the zoom-out mode shown in FIG. 16, the map image may be displayed until immediately before the state shown in FIG. 16, and the map image may not be displayed in the state shown in FIG. 16.

(Details of Game Processing)

Next, an example of game processing performed by the main body apparatus 2 is specifically described. First, data stored in the main body apparatus 2 is described.

Figure 17:
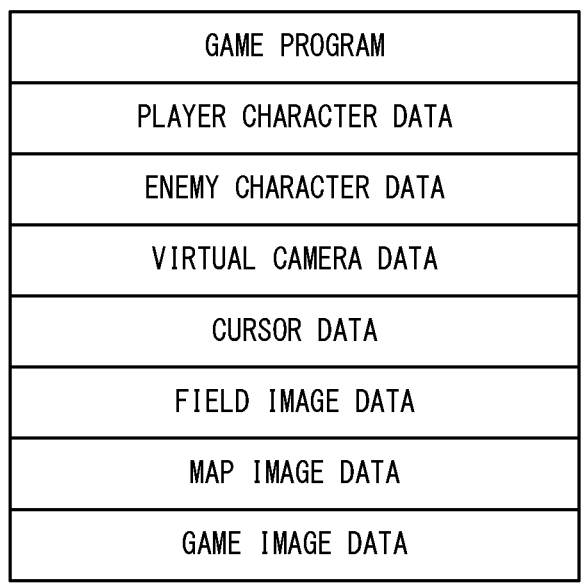
FIG. 17 is a diagram showing an example of example non-limiting data stored in a memory of a main body apparatus 2.

FIG. 17 is a diagram showing an example of data stored in the memory of the main body apparatus 2. As shown in FIG. 17, the main body apparatus 2 stores a game program, player character data, enemy character data, virtual camera data, cursor data, field image data, map image data, and game image data.

The game program is a program for executing the game according to the exemplary embodiment. The game program is stored in the storage device of the main body apparatus 2 or the external storage medium. When the game according to the exemplary embodiment is started, the game program is loaded into the memory. The player character data is data regarding the player character 50 (and the other player characters). The player character data includes data regarding the position on the field, the physical strength parameter, the movement strength parameter, the type, the offensive strength, and the like of the player character 50. The enemy character data is data regarding the enemy character 60 (and the other enemy characters). The enemy character data includes data regarding the position on the field, the physical strength parameter, the movement strength parameter, the type, the offensive strength, and the like of the enemy character 60.

The virtual camera data is data related to the virtual camera VC and includes information such as the position in the virtual space, the orientation including the direction of the line of sight, and the angle of view regarding zooming in or zooming out of the virtual camera VC.

The cursor data is data regarding the cursor 70 and includes information regarding an indicated position indicated by the cursor 70, information indicating whether or not a character (the player character 50 or the like) is selected, and the like.

The field image data is data indicating the field image. The field image is an image prepared in advance and is also a planar image obtained by viewing the field from directly above the virtual space (e.g., an image of the simplified field). It should be noted that as the field image, another image may be prepared in advance, or an image obtained by capturing the field in the virtual space from above (e.g., directly above) the virtual space with a virtual camera may be used.

The map image data is data necessary to display the map image 80. Further, the game image data is data indicating a game image and is also an image including an image generated based on the virtual camera VC and the map image 80.

Figure 18:
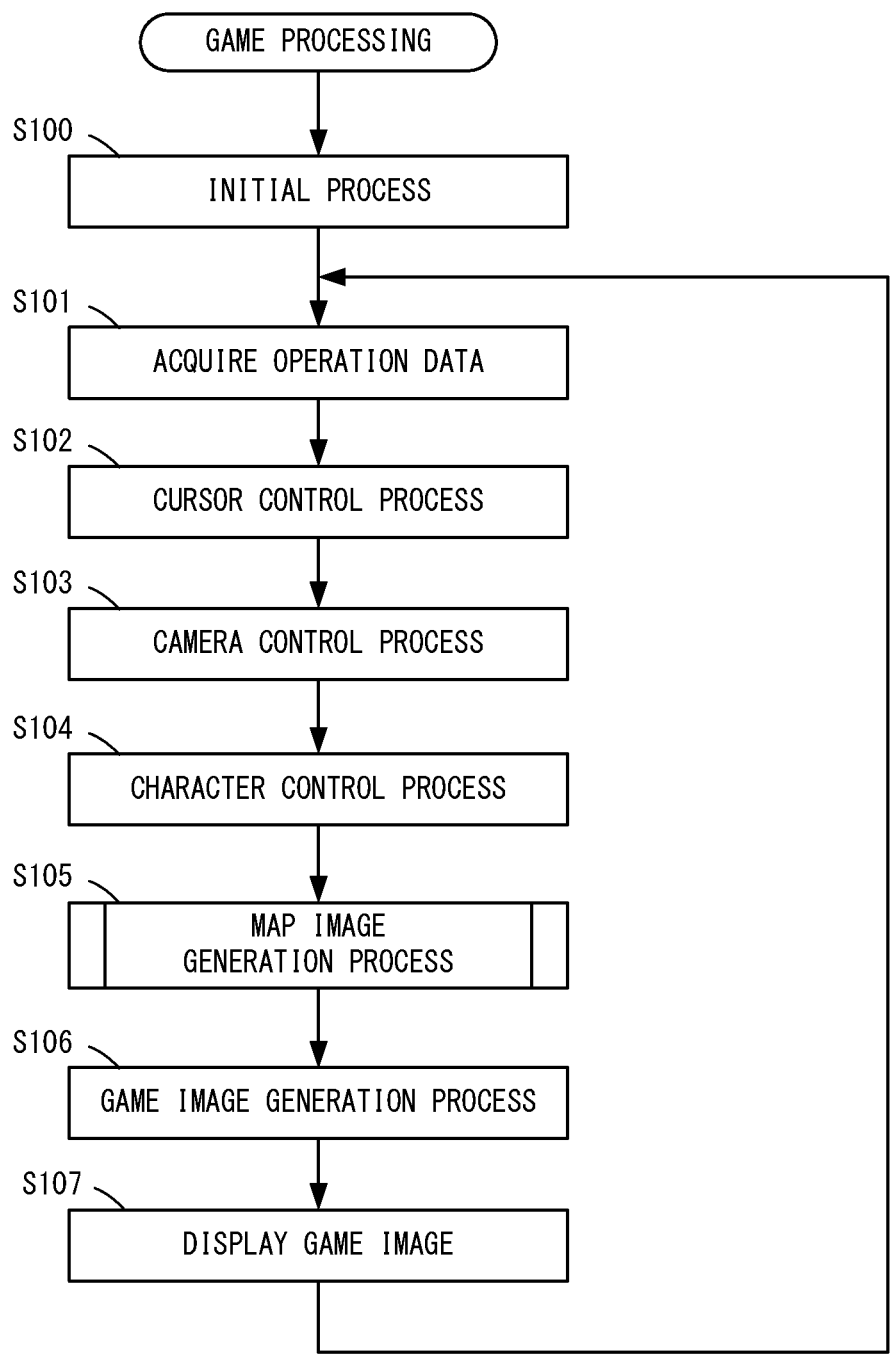
FIG. 18 is a flow chart showing an example of example non-limiting game processing performed by the main body apparatus 2.

Next, a description is given of the details of the game processing performed by the main body apparatus 2. FIG. 18 is a flow chart showing an example of the game processing performed by the main body apparatus 2. The processing shown in FIG. 18 is performed by the CPU of the main body apparatus 2 executing the game program.

As shown in FIG. 18, when the execution of the game program is started, an initial process is performed (step S100). In the initial process, the virtual space is defined, and various objects (the player character 50, the enemy character 60, the cursor 70, the information objects, and the like) are placed on the field in the virtual space, and the virtual camera VC is placed.

Next, the main body apparatus 2 acquires operation data indicating an operation performed on the left controller 3 or the right controller 4 (step S101). Next, the main body apparatus 2 performs a cursor control process (step S102). For example, based on the acquired operation data, the main body apparatus 2 determines whether or not a movement operation for moving the cursor (e.g., an operation on the analog stick 32) is performed. When the movement operation for moving the cursor is performed, the main body apparatus 2 moves the cursor 70. Further, when the cursor 70 indicates the player character 50, then based on the operation data, the main body apparatus 2 determines whether or not a selection operation for selecting the player character 50 (e.g., the pressing of any of the operation buttons 41) is performed. When the selection operation is performed, the main body apparatus 2 selects the player character 50. Further, in the cursor control process, when the player character 50 is selected, and the position of the cursor 70 is within the movable range of the player character 50, the main body apparatus 2 places the range object 76 on the field in the virtual space.

Next, the main body apparatus 2 performs a camera control process (step S103). For example, based on the acquired operation data, when the operation of changing the direction of the virtual camera VC (e.g., an operation on the analog stick 42) is performed, the main body apparatus 2 changes the direction of the virtual camera VC (see FIG. 9). Further, when the position indicated by the cursor 70 moves, the main body apparatus 2 moves the virtual camera VC in the virtual space such that the position indicated by the cursor 70 and the fixation point of the virtual camera VC coincide with each other (or the fixation point of the virtual camera VC has a predetermined relationship with the position indicated by the cursor 70). Further, based on the operation data, the main body apparatus 2 changes the zoom rate of the virtual camera VC and changes the mode in accordance with the zoom rate. For example, when the operation of switching to the zoom-in mode is performed, the main body apparatus 2 switches the mode of the virtual camera VC to the zoom-in mode. When the virtual camera VC is in the zoom-in mode, the image as shown in FIG. 2 is displayed. Further, when the operation of switching to the zoom-out mode is performed, the main body apparatus 2 switches the mode of the virtual camera VC to the zoom-out mode. When the virtual camera VC is in the zoom-out mode, the image as shown in FIG. 16 is displayed. In each mode, it is also possible to further change the zoom rate in the range where the mode is not switched. Further, when the virtual camera VC is in the zoom-in mode, then based on the operation data, the main body apparatus 2 sets the direction of the line of sight of the virtual camera VC to the first direction or the second direction.

After step S103, the main body apparatus 2 performs a character control process (step S104). In the character control process, a movement process and an attack process on the characters (the player character 50 and the enemy character 60) are performed. For example, when a determination operation (e.g., the pressing of the operation buttons 41) is performed in the state where the player character 50 is selected, the position indicated by the cursor 70 is the movable range of the player character 50. When the enemy character 60 is not present at the indicated position, the movement process on the player character 50 is performed. Consequently, the player character 50 moves to the section indicated by the cursor 70. Further, when the enemy character 60 is present at the position indicated by the cursor 70 in the state where the player character 50 is selected, then in accordance with a determination operation for determining an attack (e.g., the pressing of the operation buttons 41), the attack process on the player character 50 is performed. Consequently, the player character 50 attacks the enemy character 60 indicated by the cursor 70. Further, when the virtual camera VC is switched to the zoom-in mode, the main body apparatus 2 places the plurality of soldier characters 51 around the player character 50 (the leader), thereby changing the player character 50 to a form in which a plurality of characters are included. Similarly, the main body apparatus 2 places the plurality of soldier characters 61 around the enemy character 60. Conversely, when the virtual camera VC is switched to the zoom-out mode, the main body apparatus 2 erases the plurality of soldier characters 51 from the virtual space and changes the player character 50 to a form in which a single character is included. The same applies to the enemy character 60. The movement and the attack of the character are made by animation. Thus, while the animation is performed, the state of the character continues to be updated in the character control process. Meanwhile, in the camera control process, the virtual camera is controlled in accordance with the animation of the character.

Further, when the player character 50 is selected, in step S104, the main body apparatus 2 performs control so that the player character 50 (the leader) is displayed to be larger than the plurality of soldier characters 51. For example, when the player character 50 is selected, the main body apparatus 2 may reduce the plurality of soldier characters 51 or enlarge the player character 50 (the leader) as compared with a case where the player character 50 is not selected.

Further, if the player character 50 is moved before a determination operation for finalizing the movement or the attack is performed as shown in FIGS. 14 and 15, in step S104, the main body apparatus 2 moves the player character 50 within the movable range in the virtual space based on the operation data. Then, when the determination operation is performed, the main body apparatus 2 moves the player character 50 (the leader) to a predetermined position in the section where the player character 50 (the leader) is currently located. Then, the main body apparatus 2 moves the plurality of soldier characters 51 following the player character 50 (the leader). Consequently, the movement of the player character 50 in section units is completed. It should be noted that in the exemplary embodiment in which at the time when the determination button is pressed, the position of the player character 50 (the leader) is not moved, the position of the player character 50 (the leader) is moved to the predetermined position in the section after a battle, when cancellation is made, when the viewpoint is switched, or the like.

After step S104, the main body apparatus 2 performs a map image generation process (step S105). Here, with reference to FIG. 19, the details of the map image generation process are described.

Figure 19:
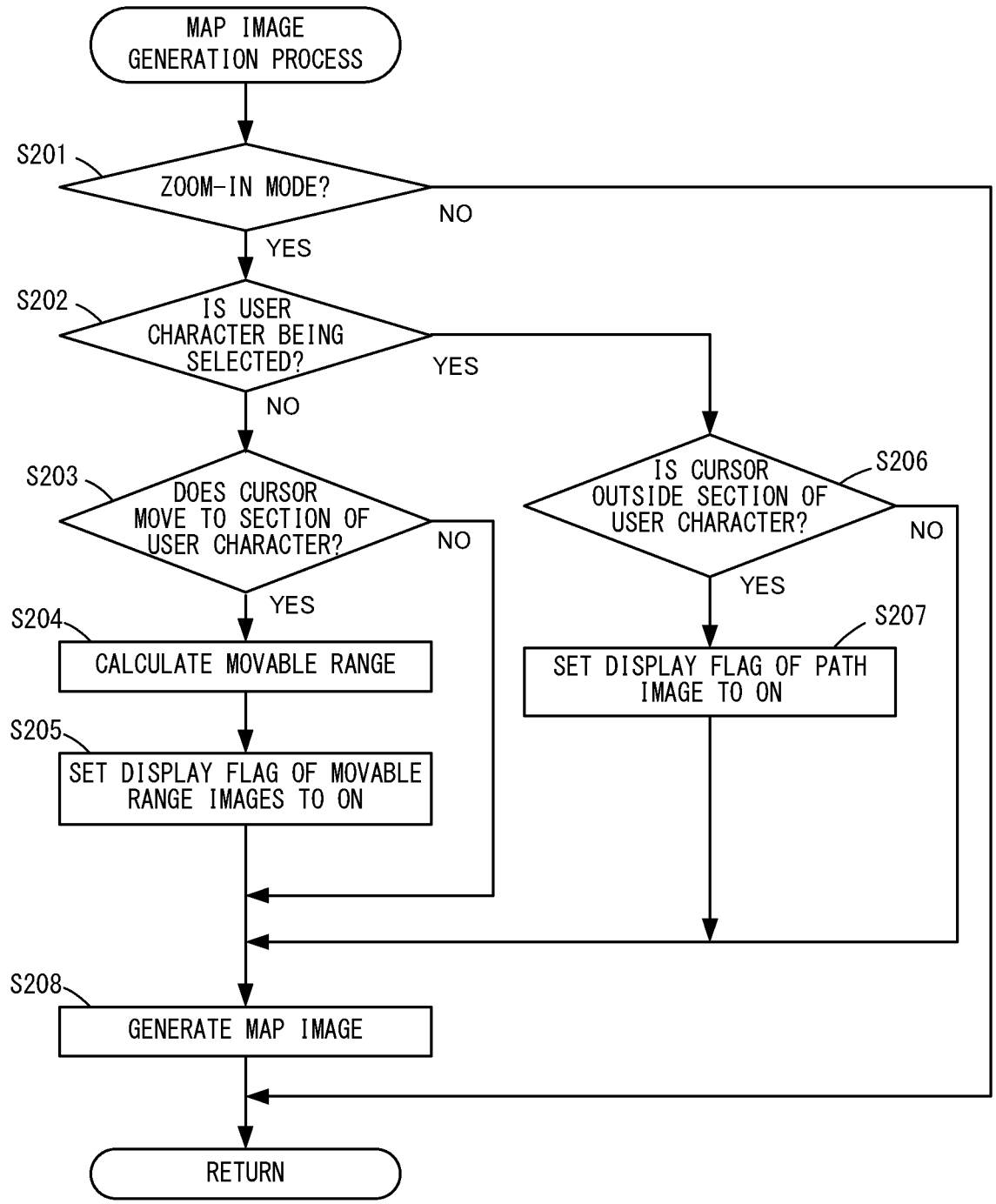
FIG. 19 is a flow chart showing the example non-limiting details of a map image generation process in step S105 in FIG. 18.

FIG. 19 is a flow chart showing the details of the map image generation process in step S105 in FIG. 18.

As shown in FIG. 19, the main body apparatus 2 determines whether or not the mode of the virtual camera VC is the zoom-in mode (step S201). When the mode of the virtual camera VC is not the zoom-in mode (step S201: NO), the main body apparatus 2 does not perform the process of generating the map image and ends the processing.

On the other hand, when the mode of the virtual camera VC is the zoom-in mode (step S201: YES), the main body apparatus 2 determines whether or not the player character 50 is being selected (step S202).

When the player character 50 is not being selected (step S202: NO), the main body apparatus 2 determines whether or not the cursor 70 moves to the section where the player character 50 is located (step S203).

When the cursor 70 moves to the section where the player character 50 is located (step S203: YES), the main body apparatus 2 calculates the movable range of the player character 50 (step S204). Specifically, based on the type of the player character 50, the main body apparatus 2 calculates the movable range. Further, based on the physical strength parameter of the player character 50 and the movement consumption amount set for each section, the main body apparatus 2 calculates the movable range. Subsequently, the main body apparatus 2 sets a display flag of the movable range images 88 indicating the movable range of the player character 50 to ON (step S205). The display flag of the movable range images 88 is a flag for determining whether or not the movable range images 88 are to be displayed. When the flag is set to on, the movable range images 88 and the attack-possible range images 89 are added when the map image is generated in step S208 described later. Consequently, the movable range images 88 and the attack-possible range images 89 are displayed in the map image 80.

It should be noted that the processes of steps S204 and S205 are executed when the cursor 70 moves to the section where the player character 50 is located. While the cursor 70 is in the section where the player character 50 is located, the display flag of the movable range images 88 is set to ON. Further, when the selection operation for selecting the player character 50 is performed, the display flag of the movable range images 88 is set to ON. On the other hand, when the selection operation for selecting the player character 50 is not performed, and the cursor 70 moves out of the section where the player character 50 is located, the display flag of the movable range images 88 is set to OFF. Further, when the determination operation for determining the movement or the attack of the player character 50 (the above character control process) is performed while the player character 50 is being selected, the display flag of the movable range images 88 is set to OFF.

On the other hand, when the player character 50 is being selected (step S202: YES), the main body apparatus 2 determines whether or not the cursor 70 is outside the section where the player character 50 is located (step S206).

When the cursor 70 is outside the section where the player character 50 is located (step S206: YES), the main body apparatus 2 sets a display flag of the path image 90 to ON (step S207). The display flag of the path image 90 is a flag for determining whether or not the path image 90 is to be displayed. When the flag is set to on, the path image 90 is added when the map image is generated in step S208 described later. It should be noted that when the determination operation for determining the movement or the attack of the player character 50 is performed, the display flag of the path image 90 is set to OFF.

When the determination is NO in step S203, or when the process of step S205 is executed, or when the determination is NO in step S206, or when the process of step S207 is executed, the main body apparatus 2 generates the map image 80 (step S208).

In step S208, the main body apparatus 2 performs the following process. First, when the display flag of the movable range images 88 is ON, then based on the movable range calculated in step S204, the main body apparatus 2 places the movable range images 88 and the attack-possible range images 89 in the field image. Further, when the display flag of the path image 90 is ON, the main body apparatus 2 generates the path image 90 (the arrow image) of which the starting point is the section where the player character 50 is located, and the ending point is the section where the position indicated by the cursor 70 is located. Then, the main body apparatus 2 places the generated path image 90 in the field image. Next, the main body apparatus 2 places each icon in the field image. Specifically, the main body apparatus 2 places the cursor icon 84 in the section corresponding to the position indicated by the cursor 70 on the field in the virtual space. Further, the main body apparatus 2 places the player character icon 86 in the section corresponding to the position of the player character 50 on the field in the virtual space. Further, the main body apparatus 2 places the enemy character icon 87 in the section corresponding to the position of the enemy character 60 on the field in the virtual space. It should be noted that in the field image, the icon images (e.g., the forest icon 82 and the rock icon 83) corresponding to objects fixed to the field, and the section images 85 indicating the sections (the plurality of vertical and horizontal dashed lines arranged at regular intervals in FIG. 3) are placed in advance. It should be noted that when these images are not drawn in the field image in advance, a placement process for placing these images may be performed in step S208.

After the above process, the main body apparatus 2 further sets the direction of the range of the map image relative to the field image. Specifically, based on the direction of the virtual camera VC, the main body apparatus 2 sets the direction of the range of the map image relative to the field image. For example, the main body apparatus 2 obtains the vector Cz' obtained by projecting the vector Cz indicating the direction of the virtual camera VC onto the XZ plane. Next, the main body apparatus 2 rotates the range of the map image relative to the field image such that the direction of the vector Cz' coincides with the up direction of the map image 80 (see FIG. 11). For example, the main body apparatus 2 calculates the angle between the vector in the Z-axis direction of the field image and the vector Cz' and rotates the range of the map image relative to the field image by the calculated angle. Then, the main body apparatus 2 sets, as the range of the map image relative to the field image, the range having the set direction centered on the position on the field image corresponding to the position indicated by the cursor 70. The field image extracted based on the range of the map image is generated as the map image 80, and the map image data is stored in the memory so that the map image 80 is always placed at a predetermined position on the display screen (a fixed position at the lower right of the screen in the exemplary embodiment), i.e., the map image 80 is placed at a position in the virtual space having a predetermined positional relationship with the virtual camera VC. As an example, each image may be placed as an object in the virtual space so that a drawing process is not performed here, and drawing is performed in a game image generation process described later. Then, only information regarding the placement and the range may be stored. For example, an object having a texture of the entirety of the field image and an object of another image may be placed in the virtual space in accordance with set position and direction. Then, when a drawing process is performed, then using a mask having the shape of the range of the map image, drawing may be performed only within the range. Further, using the field image as a texture, regarding an object having the shape of the range of the map image, the range of the texture may be specified in accordance with set position and direction. In another example, at this time, the map image 80 may be stored once as a planar object having as a texture a two-dimensional image obtained by drawing a display content. Further, the map image 80 may be stored as two-dimensional image information, and may be superimposed on a game image later.

After the process of step S208, the main body apparatus 2 ends the processing shown in FIG. 19 and returns to the processing in FIG. 18.

Referring back to FIG. 18, after step S105, the main body apparatus 2 performs a game image generation process (step S106). Specifically, the main body apparatus 2 generates the virtual space image 100 based on the virtual camera VC and generates a game image including the map image 80 generated based on the information set in step S105 and the generated virtual space image 100. Specifically, an object representing the map image 80 is placed at a predetermined position on the near side of the virtual camera VC, and a drawing process is performed together with the virtual space, thereby generating the game image. There are various drawing techniques as described above. For example, in another example, after the virtual space image 100 is generated, the two-dimensional map image 80 may be overwritten. Then, the main body apparatus 2 displays the generated game image on the display screen 12 (step S107).

After the process of step S107, the main body apparatus 2 executes the process of step S101 again. Until the game ends, the processes of steps S101 to S107 are repeatedly executed at predetermined time intervals (e.g., 1/60-second intervals).

It should be noted that the processes shown in the above flow charts are merely illustrative, and the order and the contents of the processes may be appropriately changed. Further, the values used in each process and determination may be changed.

As described above, in the exemplary embodiment, a game is performed where a field is defined in a three-dimensional virtual space, and on the field, a player character and an enemy character fight against each other by moving in section units set on the field. On a display screen, a game image including an image of the virtual space based on a virtual camera and a map image representing the field is displayed. The map image includes an image indicating the player character and images indicating the movable range of the player character (images indicating sections where the player character can move). When the direction of the virtual camera in the virtual space changes, an image representing the field in the map image rotates such that the up direction of the map image corresponds to the direction along the field in the direction of the virtual camera. In other words, even when the direction of the virtual camera changes, the map image is displayed such that the depth direction of the image of the virtual space and the up direction of the map image correspond to each other.

Not only do the virtual camera and the map image merely operate in conjunction with each other, but also the images indicating the movable range are displayed on the map image. Thus, the user can move the player character by viewing at least the map image, thereby advancing the game. The game is advanced while viewing the map image, and a realistic image in the virtual space is generated based on the virtual camera. Thus, it is possible to perform the game while viewing the detailed situation of the virtual space. Further, the image of the virtual space based on the virtual camera and the map image are displayed on a single screen. Thus, it is not necessary to switch these images. Thus, it is possible to smoothly advance the game.

(Variations)

While the game according to the exemplary embodiment has been described above, the game may be modified as follows.

For example, in the above exemplary embodiment, the characters (the player character and the enemy character) move in grid units set on the field in the virtual space. In another exemplary embodiment, the shape of a section set in the field is not limited to a square grid, but may be any shape. For example, the shape of each section may be a polygon such as a triangle, a rectangle, a hexagon, or an octagon. Then, on the field divided into sections of a predetermined shape, and each character may move in the section units.

Further, in a game where a character advances in accordance with squares, such as sugoroku, the image of the virtual space based on the virtual camera and the map image that are described above may be displayed. For example, a character is placed on the field in the virtual space, and the character advances in accordance with squares set in the virtual space. In such a game, as in the above exemplary embodiment, the image of the virtual space based on the virtual camera and the map image may be displayed on the display screen. In the map image, a square to which the character advances is displayed, and images indicating squares where the character can move are displayed. When the direction of the virtual camera changes, then similarly to the above exemplary embodiment, the image may be rotated, and the map image may be displayed such that the up direction of the map image and the direction of the virtual camera correspond to each other.

Further, in a game where characters scramble for countries or regions set in a virtual space, the image of the virtual space based on the virtual camera and the map image that are described above may be displayed. For example, a plurality of countries or regions are set on the field in the virtual space, and a character advances the game while taking a country or a region. In such a game, as in the above exemplary embodiment, the image of the virtual space based on the virtual camera and the map image may be displayed on the display screen. In the map image, images indicating countries or regions where the character can move is displayed. When the direction of the virtual camera changes, then similarly to the above exemplary embodiment, the image may be rotated, and the map image may be displayed such that the up direction of the map image and the direction of the virtual camera correspond to each other.

That is, a "section" as used herein may not only be an area obtained by dividing a field in a virtual space by a predetermined shape, but also indicate a square in a game such as sugoroku or indicate a country or a region in the above game.

Further, in the above exemplary embodiment, the field image representing the field is prepared in advance. In another exemplary embodiment, as an image representing the field, an image obtained by capturing the field in the virtual space from above the virtual space with the virtual camera may be generated, and the map image may be displayed on the screen based on the generated image.

Further, at least any of the plurality of images included in the game image may not be displayed. For example, in the virtual space image 100, the cursor 70 may not be displayed.

While the exemplary embodiment has been described, the above description is merely illustrative, and the exemplary embodiment may be improved and modified in various manners.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A computer-readable non-transitory storage medium having stored therein a game program executed by at least one processor of an information processing apparatus, the game program causing the at least one processor to:

based on an operation input, control an operation target object on a field in a three-dimensional virtual space;

based on an operation input, control at least a direction of a virtual camera in the virtual space;

generate a map image representing a range of at least a part of the field;

generate a game image at least including an image of the virtual space based on the virtual camera and the map image;

based on the operation input, move the operation target object in units of predetermined sections set in the field;

in accordance with a change in the direction of the virtual camera, rotate an image representing the field, such that an up direction of the map image when the map image is displayed corresponds to a direction along the field in the direction of the virtual camera; and generate the map image including the image representing the field, an image representing the operation target object, images indicating the sections, and an image indicating a movable range of the operation target object regarding a movement in the units of the sections.

2. The computer-readable non-transitory storage medium having stored therein the game program according to claim 1, further causing the at least one processor to:

based on an operation input, indicate a section as a movement destination of the operation target object within the movable range;

when an operation input for finalizing the indicated section as the movement destination is provided, move the operation target object to the indicated section as the movement destination; and when the section as the movement destination is indicated, generate the map image further including a path image indicating a path from a section where the operation target object is placed before the movement to the indicated section.

3. The computer-readable non-transitory storage medium having stored therein the game program according to claim 1, further causing the at least one processor to, in accordance with a movement of the virtual camera, move the range of the field included in the map image, and generate the map image so as to include the image representing the field in a field of view of the virtual camera.

4. The computer-readable non-transitory storage medium having stored therein the game program according to claim 3, further causing the at least one processor to:

based on a direction input included in the operation input, move an indicated position in the virtual space in a direction on the field corresponding to the input direction relative to the image of the virtual space based on the virtual camera or the map image;

move the virtual camera in accordance with the indicated position; and generate the map image such that a section indicated by the indicated position is placed in a center of the map image.

5. The computer-readable non-transitory storage medium having stored therein the game program according to claim 4, further causing the at least one processor to:

in a case where a determination instruction is given based on the operation input when a character object is placed in the indicated section, select as the operation target object the character object placed in the indicated section;

move the selected character object in the units of the predetermined sections set in the field; and generate the map image including the image representing the field, an image representing the selected character object, the images indicating the sections, and the image indicating the movable range of the character object regarding a movement in the units of the sections.

6. The computer-readable non-transitory storage medium having stored therein the game program according to claim 1, further causing the at least one processor to:

perform zoom control of the virtual camera based on the operation input; and in accordance with the zoom control, changes a form of the operation target object, and when a zoom rate is higher than a predetermined zoom rate, change the form of the operation target object to a form in which a plurality of objects are included.

7. The computer-readable non-transitory storage medium having stored therein the game program according to claim 1, further causing the at least one processor to:

perform zoom control of the virtual camera based on the operation input; and in accordance with the zoom control, switches a display state and a hidden state of the map image, and when a zoom rate is lower than a predetermined zoom rate, hide the map image.

8. The computer-readable non-transitory storage medium having stored therein the game program according to claim 7, further causing the at least one processor to, when the map image is hidden, display the image indicating the movable range in the image of the virtual space.

9. The computer-readable non-transitory storage medium having stored therein the game program according to claim 1, further causing the at least one processor to calculate the movable range based on a movable amount indicating the number of sections where the operation target object can move at one time set for the operation target object, and a movement consumption amount set with respect to each section of the field.

10. The computer-readable non-transitory storage medium having stored therein the game program according to claim 1, further causing the at least one processor to:

cause the operation target object to perform an attack action of attacking an enemy object in the virtual space specified based on the operation input after a movement; and generate the map image including the image indicating the movable range and an image indicating an attack-possible range of the operation target object.

11. The computer-readable non-transitory storage medium having stored therein the game program according to claim 1, further causing the at least one processor to calculate an attack-possible range of an enemy object in the virtual space and generates the map image further including an image indicating the attack-possible range of the enemy object.

12. The computer-readable non-transitory storage medium having stored therein the game program according to claim 10, wherein the image representing the operation target object includes an image indicating the operation target object that is an icon image indicating a type of the operation target object, and a parameter image indicating a physical strength parameter of the operation target object, the game program further causing the at least one processor to generate the map image further including an image indicating the enemy object that is an icon image indicating a type of the enemy object, and a parameter image indicating a physical strength parameter of the enemy object.

13. The computer-readable non-transitory storage medium having stored therein the game program according to claim 1, further causing the at least one processor to:
- based on the operation input, indicate a section as a movement destination of the operation target object within the movable range;
- move the operation target object to the indicated section as the movement destination; and
- place in the virtual space a range object indicating the movable range, and a path object indicating a path from a section where the operation target object is placed before the movement to the indicated section of the movement destination.

14. The computer-readable non-transitory storage medium having stored therein the game program according to claim 13, further causing the at least one processor to further place in the virtual space an information object indicating information regarding the operation target object.

15. The computer-readable non-transitory storage medium having stored therein the game program according to claim 1, further causing the at least one processor to:
- based on an operation input, select the operation target object;
- before a predetermined finalization operation is performed, based on an operation input, move the selected operation target object to any position within the movable range in the virtual space;
- when the finalization operation is performed, finalize a movement of the operation target object to a section where the operation target object moved by the movement before the finalization operation is performed is located; and while the operation target object is moved by the movement before the finalization operation is performed, generate the map image further including a path image indicating a path from a section corresponding to a position of the operation target object before the operation target object is moved by the movement to a section corresponding to a position of the operation target object while the operation target object is moved by the movement.

16. The computer-readable non-transitory storage medium having stored therein the game program according to claim 15, further causing the at least one processor to, when a cancellation operation for canceling the movement is performed before the finalization operation is performed, return the operation target object to the position before the operation target object is moved by the movement.

17. The computer-readable non-transitory storage medium having stored therein the game program according to claim 15, wherein
- the operation target object includes a first character and a second character,
- the game program further causing the at least one processor to, based on the operation input, move the first character to any position within the movable range in the virtual space, and in accordance with the movement of the first character, move the second character following the first character.

18. The computer-readable non-transitory storage medium having stored therein the game program according to claim 15, wherein
- the operation target object includes a first character and a second character,
- the game program further causing the at least one processor to, when the operation target object is selected, display the first character to be larger than the second character.

19. An information processing system including at least one processor configured to:
- based on an operation input, control an operation target object on a field in a three-dimensional virtual space;
- based on an operation input, control at least a direction of a virtual camera in the virtual space;
- generate a map image representing a range of at least a part of the field; and
- generate a game image at least including an image of the virtual space based on the virtual camera and the map image;
- based on the operation input, move the operation target object in units of predetermined sections set in the field;
- in accordance with a change in the direction of the virtual camera, rotate an image representing the field, such that an up direction of the map image when the map image is displayed corresponds to a direction along the field in the direction of the virtual camera; and
- generate the map image including the image representing the field, an image representing the operation target object, images indicating the sections, and an image indicating a movable range of the operation target object regarding a movement in the units of the sections.

20. The information processing system according to claim 19, further causing the at least one processor to:
- based on an operation input, indicate a section as a movement destination of the operation target object within the movable range;
- when an operation input for finalizing the indicated section as the movement destination is provided, move the operation target object to the indicated section as the movement destination; and
- when the section as the movement destination is indicated, generate the map image further including a path image indicating a path from a section where the operation target object is placed before the movement to the indicated section.

21. The information processing system according to claim 19, further causing the at least one processor to, in accordance with a movement of the virtual camera, move the range of the field included in the map image, and generate the map image so as to include the image representing the field in a field of view of the virtual camera.

22. The information processing system according to claim 21, further causing the at least one processor to:
- based on a direction input included in the operation input, move an indicated position in the virtual space in a direction on the field corresponding to the input direction relative to the image of the virtual space based on the virtual camera or the map image;
- move the virtual camera in accordance with the indicated position; and
- generate the map image such that a section indicated by the indicated position is placed in a center of the map image.

23. The information processing system according to claim 22, further causing the at least one processor to:
- in a case where a determination instruction is given based on the operation input when a character object is placed in the indicated section, select as the operation target object the character object placed in the indicated section;
- move the selected character object in the units of the predetermined sections set in the field; and
- generate the map image including the image representing the field, an image representing the selected character object, the images indicating the sections, and the image indicating the movable range of the character object regarding a movement in the units of the sections.

24. The information processing system according to claim 19, further causing the at least one processor to:
perform zoom control of the virtual camera based on the operation input; and
in accordance with the zoom control, changes a form of the operation target object, and when a zoom rate is higher than a predetermined zoom rate, change the form of the operation target object to a form in which a plurality of objects are included.

25. The information processing system according to claim 19, further causing the at least one processor to:
perform zoom control of the virtual camera based on the operation input; and
in accordance with the zoom control, switches a display state and a hidden state of the map image, and when a zoom rate is lower than a predetermined zoom rate, hide the map image.

26. The information processing system according to claim 25, further causing the at least one processor to, when the map image is hidden, display the image indicating the movable range in the image of the virtual space.

27. The information processing system according to claim 19, further causing the at least one processor to calculate the movable range based on a movable amount indicating the number of sections where the operation target object can move at one time set for the operation target object, and a movement consumption amount set with respect to each section of the field.

28. The information processing system according to claim 19, further causing the at least one processor to:
cause the operation target object to perform an attack action of attacking an enemy object in the virtual space specified based on the operation input after a movement; and
generate the map image including the image indicating the movable range and an image indicating an attack-possible range of the operation target object.

29. The information processing system according to claim 19, further causing the at least one processor to calculate an attack-possible range of an enemy object in the virtual space and generates the map image further including an image indicating the attack-possible range of the enemy object.

30. The information processing system according to claim 28, wherein
the image representing the operation target object includes an image indicating the operation target object that is an icon image indicating a type of the operation target object, and a parameter image indicating a physical strength parameter of the operation target object, and
the information processing system further causing the at least one processor to generate the map image further including an image indicating the enemy object that is an icon image indicating a type of the enemy object, and a parameter image indicating a physical strength parameter of the enemy object.

31. The information processing system according to claim 19, further causing the at least one processor to:
based on the operation input, indicate a section as a movement destination of the operation target object within the movable range;
move the operation target object to the indicated section as the movement destination; and
place in the virtual space a range object indicating the movable range, and a path object indicating a path from a section where the operation target object is placed before the movement to the indicated section of the movement destination.

32. The information processing system according to claim 31, further causing the at least one processor to further place in the virtual space an information object indicating information regarding the operation target object.

33. The information processing system according to claim 19, further causing the at least one processor to:
based on an operation input, select the operation target object;
before a predetermined finalization operation is performed, based on an operation input, move the selected operation target object to any position within the movable range in the virtual space;
when the finalization operation is performed, finalize a movement of the operation target object to a section where the operation target object moved by a movement before the finalization operation is performed is located; and
while the operation target object is moved by the movement before the finalization operation is performed, generate the map image further including a path image indicating a path from a section corresponding to a position of the operation target object before the operation target object is moved by the movement to a section corresponding to a position of the operation target object while the operation target object is moved by the movement.

34. The information processing system according to claim 33, further causing the at least one processor to, when a cancellation operation for canceling the movement is performed before the finalization operation is performed, return the operation target object to the position before the operation target object is moved by the movement.

35. The information processing system according to claim 33, wherein
the operation target object includes a first character and a second character,
the information processing system further causing the at least one processor to, based on the operation input, move the first character to any position within the movable range in the virtual space, and in accordance with the movement of the first character, move the second character following the first character.

36. The information processing system according to claim 33, wherein
the operation target object includes a first character and a second character,
the game program further causing the at least one processor to, when the operation target object is selected, display the first character to be larger than the second character.

37. An information processing apparatus including at least one processor configured to:
based on an operation input, control an operation target object on a field in a three-dimensional virtual space;
based on an operation input, control at least a direction of a virtual camera in the virtual space;
generating a map image representing a range of at least a part of the field; and
generate a game image at least including an image of the virtual space based on the virtual camera and the map image;

based on the operation input, move the operation target object in units of predetermined sections set in the field;

in accordance with a change in the direction of the virtual camera, rotate an image representing the field, such that an up direction of the map image when the map image is displayed corresponds to a direction along the field in the direction of the virtual camera; and generate the map image including the image representing the field, an image representing the operation target object, images indicating the sections, and an image indicating a movable range of the operation target object regarding a movement in the units of the sections.

38. An information processing method executed by an information processing system configured to:

based on an operation input, control an operation target object on a field in a three-dimensional virtual space;

based on an operation input, control at least a direction of a virtual camera in the virtual space;

generate a map image representing a range of at least a part of the field;

generate a game image at least including an image of the virtual space based on the virtual camera and the map image;

based on the operation input, move the operation target object in units of predetermined sections set in the field;

in accordance with a change in the direction of the virtual camera, rotate an image representing the field, such that an up direction of the map image when the map image is displayed corresponds to a direction along the field in the direction of the virtual camera; and generate the map image including the image representing the field, an image representing the operation target object, images indicating the sections, and an image indicating a movable range of the operation target object regarding a movement in the units of the sections.

* * * * *